United States Patent
Suzuki et al.

(10) Patent No.: US 6,567,427 B1
(45) Date of Patent: May 20, 2003

(54) IMAGE SIGNAL MULTIPLEXING APPARATUS AND METHODS, IMAGE SIGNAL DEMULTIPLEXING APPARATUS AND METHODS, AND TRANSMISSION MEDIA

(75) Inventors: Teruhiko Suzuki, Chiba (JP); Yoichi Yagasaki, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/272,238

(22) Filed: Mar. 18, 1999

Related U.S. Application Data

(63) Continuation of application No. PCT/JP98/03235, filed on Jul. 17, 1998.

(30) Foreign Application Priority Data

Jul. 18, 1997 (JP) .............................. 9-193641

(51) Int. Cl.[7] .................................. H04J 3/02
(52) U.S. Cl. .................. 370/535; 370/537; 370/542; 370/522; 345/419; 345/581
(58) Field of Search .................. 370/485, 535, 370/537, 542, 522; 345/581, 582, 419

(56) References Cited

U.S. PATENT DOCUMENTS

| | | | |
|---|---|---|---|
| 5,179,443 A | 1/1993 | Sugimori et al. | 358/141 |
| 5,329,360 A | 7/1994 | Gillard et al. | 348/472 |
| 5,418,570 A | 5/1995 | Ueno et al. | 348/413 |
| 6,243,488 B1 * | 6/2001 | Penna | 382/154 |
| 6,285,370 B1 * | 9/2001 | McDowall et al. | 345/419 |
| 6,381,254 B1 * | 4/2002 | Mori et al. | 370/537 |

FOREIGN PATENT DOCUMENTS

| | | | |
|---|---|---|---|
| EP | 0753970 A2 | 1/1997 | H04N/7/26 |
| JP | 10-004539 | 1/1998 | H04N/7/08 |
| WO | 98/10593 | 3/1998 | H04N/7/26 |

OTHER PUBLICATIONS

Kotaro Asai, "MPEG4 Video Verification Mode (in Japanese)", Preprints of 1996 Winter Meeting of Image Media Section, The Institute of Television Engineers of Japan, Dec., 1996, p. 33–38 (Tokyo) 1996.

Minoru Etoh, "Trend of MPEG4 Moving Picture Coding Standardization (in Japanese)", with an English Abstract "Current Status of An Emerging Coding Standard, MPEG4", Technical Report of IEICE, vol. 95, No. 469, p. 55–60 (Tokyo) 1996.

Toshio Miki, Toshiro Kawahara, Tomoyuki Oya, Sanae Hoya, "Trend in Standardization of MPEG4 (in Japanese)", with an English Abstract "MPEG4 Standardization Activities", Technical Report of IEICE, vol. 95, No. 539, p. 43–48 (Tokyo) 1996.

(List continued on next page.)

*Primary Examiner*—Min Jung
(74) *Attorney, Agent, or Firm*—Sonnenschein, Nath & Rosenthal

(57) ABSTRACT

In an image signal demultiplexing apparatus, a scene descriptor, object descriptors and respective bitstreams are separated by a demultiplexer circuit, and the respective bitstreams are decoded by decoders. Within output data from the decoders, output data associated with the same object descriptor (output data composing the same object) are mixed by a mixer circuit. Subsequently, the mixed output data is supplied to an object synthesizer circuit of a synthesizer circuit which is supplied with a corresponding node. Then, the object synthesizer circuit corresponds one image to one object to perform texture mapping. An image signal multiplexing apparatus multiplexes the scene descriptor, respective bitstreams, and information related to the bitstreams.

20 Claims, 30 Drawing Sheets

OTHER PUBLICATIONS

Mnoru Etoh, "Trend in Standardization of MPEG4 (in Japanese)", The Journal of the Institute of Image Electronics Engineers of Japan, vol. 25, No. 3, p. 223–228 (Tokyo) 1996.

ISO/IEC JTC1/SC29 WG11, "MPEG4 Video Verification Model Version 7.0," International Organization for Standardization, Apr. 1, 1997, pp. 107–108 (XP–002089554).

ISO/IEC JTC1/WG11 MPEG4/N1172, Munich Meeting of MPEG–4 Working Group, International Organization for Standardization, Jan. 1, 1996, pp. 3–49 (XP–002047798).

R. Koenen Et Al., "MPEG–4: Context and Objectives," Signal Processing: Image Communication, vol. 9, No. 4, May 1, 1997, pp. 295–304.

* cited by examiner

| | |
|---|---|
| ObjectDescriptor() | |
| { | |
|     NodeId | 10 |
|     streamCount | 5 |
|     extensionFlag | 1 |
|     for(j=0;j<streamCount;j++) | |
|     { | |
|         ES_Descriptor() | |
|     } | |
|     for(extensionFlag==1) | |
|     { | |
|         descriptorCount | 8 |
|         for(j=0;j<descriptorCount;j++) | |
|         { | |
|             Descriptor() | 8 |
|         } | |
|     } | |
| } | |

ObjectDescriptor Syntax

FIG. 7

| ES_Descriptor() | |
|---|---|
| { | |
| ES_Number | 5 |
| reserved | 2 |
| extensionFlag | 1 |
| streamType() | 8 |
| QoS_Descriptor() | 8 |
| ESConfigParams() | 8 |
| if(extensionFlag==1) | |
| { | |
| descriptorCount | |
| for(j=0;j<descriptorCount;j++) | |
| { | |
| Descriptor() | 8 |
| } | |
| } | |
| } | |

ES_Descriptor syntax

FIG. 8

| ESConfigParams() | |
|---|---|
| { | |
|     predefined | 8 |
|     if(predefined==0) | |
|     { | |
|         bufferSizeEB | 24 |
|         useTimeStamps | 1 |
|         useOCR | 1 |
|         timeStampResolution | 32 |
|         OCRResolution | 32 |
|         timeStampLength | 6 |
|         OCRlength | 6 |
|         if(!useTimeStamps) | |
|         { | |
|             accessUnitDecodingRate | 16 |
|             accessUnitPresentationRate | 16 |
|             startDecodingTimeStamp | timeStampLength |
|             startPresentationTimeStamp | timeStampLength |
|         } | |
|         AU_Length | 4 |
|         instantBitrateLength | 8 |
|         streamPriority | 5 |
|         degradationPriorityLength | 4 |
|         seqNumLength | 4 |
|     } | |
| } | |

ES_ConfigParams syntax

FIG. 9

```
MovieTexture{
exposedField SFBool loop FALSE
exposedField SFFloat speed 1
exposedField SFTime startTime 0
exposedField SFTime stopTime 0
exposedField SFObjectID objectDescriptorID-1
field SFBool repeatS TRUE
field SFBool repeatT TRUE
eventOut SFFloat duration_changed
eventOut SFBool isActive
}
```

SCENE DESCRIPTOR
(FOR MOTION PICTURE)

FIG. 10

```
ImageTexture{
exposedField SFObjectID objectDescriptorID-1
field SFBool repeatS TRUE
field SFBool repeatT TRUE
}
```

SCENE DESCRIPTOR
(FOR STILL IMAGE)

FIG. 11

| | |
|---|---|
| ES_Descriptor() | |
| { | |
|     ES_Number | 5 |
|     reserved | 2 |
|     isOtherStream | 1 |
|     if(isOtherStream){ | |
|         streamCount | 5 |
|         for(I=0;I<streamCount;I++){ | |
|             ES_Number | 5 |
|         } | |
|     } | |
|     extensionFlag | 1 |
|     streamType() | 8 |
|     QoS_Descriptor() | 8 |
|     ESConfigParams() | 8 |
|     if(extensionFlag==1) | |
|     { | |
|         descriptorCount | |
|         for(j=0;j<descriptorCount;j++) | |
|         { | |
|             Descriptor() | 8 |
|         } | |
|     } | |
| } | |

ES_Descriptor syntax

FIG. 13

IMAGE SIGNAL DECODER

IMAGE SIGNAL DECODER

IMAGE SIGNAL DECODER

VOP ENCODER CIRCUIT 103-0

Enhancement
Layer2
(UPPER LAYER 2)
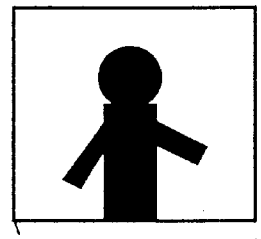
Enhancement
Layer1
(UPPER LAYER 1)
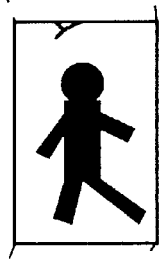
Base Layer
(LOWER LAYER)
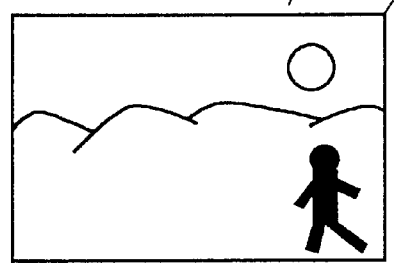
FIG. 27

Enhancement
Layer2
(UPPER LAYER 2)
Enhancement
Layer1
(UPPER LAYER 1)
Base Layer
(LOWER LAYER)
FIG. 31

IMAGE SIGNAL MULTIPLEXING APPARATUS AND METHODS, IMAGE SIGNAL DEMULTIPLEXING APPARATUS AND METHODS, AND TRANSMISSION MEDIA

This application is a continuation of international application No. PCTJP98/03235, filed Jul. 17, 1998, now pending.

TECHNICAL FIELD

The present invention relates to image signal multiplexing apparatus and methods, image signal demultiplexing apparatus and methods, and transmission media, and more particularly to image signal multiplexing apparatus and methods, image signal demultiplexing apparatus and methods, and transmission media which are suitable for use with data that may be recorded on a recording medium such as a magneto-optical disc, a magnetic tape or the like, reproduced from such a recording medium to be displayed on a display, and data transmitted from a transmission side to a reception side through a transmission path for displaying, editing and recording on the reception side such as in a teleconference system, a television telephone system, broadcasting equipment, a multimedia database search system and so on.

BACKGROUND ART

In a system for transmitting a motion picture signal to a remote location, for example, such as a teleconference system, a television telephone system or the like, an image signal is compress-encoded utilizing line correlation and interframe correlation of the image signal in order to efficiently utilize a transmission path.

Also, in recent years, as the processing performance of computers has been improved, a motion picture information terminal using a computer is becoming more and more popular. In such a system, information is transmitted through a transmission path such as a network to a remote location. Similarly, in this case, signals such as image signals, audio signals and data to be transmitted are compress-encoded for transmission in order to efficiently utilize the transmission path.

On a terminal side, a compressed signal transmitted thereto is decoded on the basis of a predetermined method to recover original image signals, audio signals, data and so on which are outputted to a display, a speaker and so on provided in the terminal. In the prior art, a transmitted image signal and so on have been merely outputted to a display device as they are, whereas in a computer-based information terminal, a plurality of such image signals, audio signals and data can be displayed in a two-dimensional or three-dimensional space after they have been transformed. Such processing can be realized by describing information on the two-dimensional and three-dimensional space in a predetermined method on the transmission side, and performing predetermined transform processing, for example, on the image signals to display in accordance with the description on a terminal.

A representative scheme for describing such spatial information is, for example, VRML (Virtual Reality Modelling Language). This has been standardized in ISO-IEC_JTC1/SC24, and its latest version VRML 2.0 is described in ISI4772. The VRML is a language for describing a three-dimensional space, wherein a collection of data is defined for describing attributes, shape and so on of a three-dimensional space. This collection of data is called a node. Describing a three-dimensional space involves describing how these predefined nodes are synthesized. For a node, data indicative of attributes such as color, texture or the like and data indicative of the shape of a polygon are defined.

On a computer-based information terminal, a predetermined object is produced by CG (Computer Graphics) using polygons and so on in accordance with descriptions such as VRML as mentioned above. With the VRML, it is also possible to map a texture to a three-dimensional object composed of thus produced polygons. A node called Texture is defined when a texture to be mapped is a still image, while a node called Movie Texture is defined when a motion picture, where information on the texture to be mapped (the name of a file, display start and end time, and so on) is described in the node.

Here, the mapping of a texture, (hereinafter, called texture mapping as appropriate) will be described with reference to FIG. 14. First, a texture to be mapped (image signal) and a signal representative of its transparency (Key signal), and three-dimensional object information are inputted from the outside, and stored in a predetermined storage area in a group of memories 151. The texture is stored in a texture memory 152; the signal representative of the transparency in a gray scale memory 153; and the three-dimensional object information in a three-dimensional information memory 154. Here, the three-dimensional object information refers to information on the shapes of polygons, information on illumination, and so on.

A rendering circuit 155 forms a three-dimensional object using polygons based on the predetermined three-dimensional object information recorded in the group of memories 151. The rendering circuit 155 reads a predetermined texture and a signal indicative of its transparency from the memory 152 and the memory 153 based on the three-dimensional object information, and maps the texture to the three-dimensional object. The signal representative of the transparency indicates the transparency of the texture at a corresponding location, and therefore indicates the transparency of the object at the position to which the texture at the corresponding position is mapped. The rendering circuit 155 supplies a two-dimensional transform circuit 156 with a signal of the object to which the texture has been mapped. The two-dimensional transform circuit 156 in turn transforms the three-dimensional object to a two-dimensional image signal produced by mapping the three-dimensional object to a two-dimensional plane based on view point information supplied from the outside. The three-dimensional object transformed into a two-dimensional image signal is further outputted to the outside. The texture may be a still image or a motion picture. With a motion picture, the foregoing operation is performed every time an image frame of the motion picture to be mapped is changed.

The VRML also supports compressed image formats such as JPEG (Joint Photographic Experts Group), which is a highly efficient coding scheme for still images, and MPEG (Moving Picture Experts Group), which is a motion picture coding scheme, as formats for textures to be mapped. In this case, a texture (image) is decoded by decode processing based on a predetermined compression scheme, and the decoded image signal is recorded in the memory 152 in the group of memories 151.

In the rendering circuit 155, a texture recorded in the memory 152 is mapped irrespective of whichever format of the image, whether a motion picture or a still image, or its contents. Only one texture stored in the memory can be mapped to a certain polygon at any time, so that a plurality of textures cannot be mapped to a single polygon.

When such three-dimensional information and texture information are transmitted through a transmission path, the information must be compressed before transmission in order to efficiently utilize the transmission path. Particularly, when a motion picture is mapped to a three-dimensional object and in other similar cases, it is essential to compress the motion picture before transmission.

For example, the above-mentioned MPEG scheme has been discussed in ISO-IEC/JTC1/SC2/WG11, and proposed as a standard plan, and a hybrid scheme, which is a combination of motion compensation differential pulse code modulation and DCT (Discrete Cosine Transform) encoding, has been employed. The MPEG defines several profiles and levels for supporting a variety of applications and functions. The most basic one is a main profile main level (MP@ML).

An exemplary configuration of an encoder for MP@ML of the MPEG scheme is described with reference to FIG. 15. An input image signal is first inputted to a group of frame memories 1, and stored in a predetermined order. Image data to be encoded is inputted to a motion vector detector circuit 2 in units of macroblocks. The motion vector detector circuit 2 processes image data of each frame as an I-picture, a P-picture, or a B-picture in accordance with a previously set predetermined sequence. It has previously been determined whether images of respective frames sequentially inputted thereto should be processed as an I-, P-, or B-picture (for example, processed in the order of I, B, P, B, P, . . . , B, P).

The motion vector detector circuit 2 performs motion compensation with reference to a previously defined predetermined reference frame to detect its motion vector. The motion compensation (interframe prediction) has three modes: forward prediction, backward prediction, and bi-directional prediction. A prediction mode for the P-picture is only the forward prediction, whereas prediction modes for the B-pictures are the three types, i.e., the forward prediction, backward prediction and bi-directional prediction. The motion vector detector circuit 2 selects a prediction mode which minimizes a prediction error, and generates a prediction vector with the selected prediction mode.

In this event, the prediction error is compared, for example, with the variance of a macroblock to be encoded, such that the prediction is not performed with that macroblock and intraframe encoding is performed instead when the variance of the macroblock is smaller. In this case, the prediction mode is an intra-image encoding (intra). The motion vector and the prediction mode are inputted to a variable-length encoder circuit 6 and a motion compensation circuit 12.

The motion compensation circuit 12 produces predicted image data based on the inputted motion vector, and inputs the predicted image data to a calculation circuit 3. The calculation circuit 3 calculates difference data between the value of a macroblock to be encoded and the value of a predicted image, and outputs the difference data to a DCT circuit 4. With an intra-macroblock, the calculation circuit 3 outputs a signal of a macroblock to be encoded to the DCT circuit 4 as it is.

The DCT circuit 4 performs DCT (Discrete Cosine Transform) on the inputted signal which is transformed into a DCT coefficient. This DCT coefficient is inputted to a quantization circuit 5 which quantizes the DCT coefficient with a quantization step corresponding to the amount of stored data (buffer storage amount) in a transmission buffer 7, and then quantization data is inputted to the variable-length encoder circuit 6.

The variable length encoder circuit 6 transforms the quantization data (for example, data on an I-picture) supplied from the quantization circuit 5 into a variable length code such as a Huffman code, corresponding to a quantization step (scale) supplied from the quantization circuit 5, and outputs the variable length code to the transmission buffer 7. The variable length encoder circuit 6 is also fed with the quantization step (scale) from the quantization circuit 5, the prediction mode (a mode indicating which of the intra-image prediction, forward prediction, backward prediction and bi-directional prediction has been set) from the motion vector detector circuit 2, and the motion vector, all of which are also variable-length-encoded.

The transmission buffer 7 temporarily stores the encoded data inputted thereto, and outputs data corresponding to the amount of storage to the quantization circuit 5. When the amount of remaining data increases to an allowable upper limit value, the transmission buffer 7 increases the quantization scale of the quantization circuit 5 through a quantization control signal to decrease the data amount of quantization data. On the contrary, when the amount of remaining data decreases to an allowable lower limit value, the transmission buffer 7 reduces the quantization scale of the quantization circuit 5 through the quantization control signal to increase the data amount of quantization data. In this way, the transmission buffer 7 is prevented from overflow and underflow. Then, encoded data stored in the transmission buffer 7 is read at predetermined timing, and outputted to a transmission path as a bitstream. On the other hand, the quantization data outputted from the quantization circuit 5 is inputted to a dequantization circuit 8, and is dequantized corresponding to the quantization step supplied from the quantization circuit 5. Output data from the dequantization circuit 8 (a DCT coefficient derived by dequantization) is inputted to IDCT (inverse DCT) circuit 9. The IDCT circuit 9 applies inverse DCT to the inputted DCT coefficient, and derived output data (difference data) is supplied to a calculation circuit 10. The calculation circuit 10 adds the difference data and the predicted image data from the motion compensation circuit 12, and the resulting output image data is stored in a frame memory (FM) 11. With an intra-macroblock, the calculation circuit 10 supplies the output data from the IDCT circuit 9 as it is to the frame memory 11.

Next, an exemplary configuration of a decoder for MP@ML of the MPEG will be described with reference to FIG. 16. Encoded image data (bitstream) transmitted through a transmission path is received by a receiver circuit, not shown, reproduced by a reproducing unit, temporarily stored in a reception buffer 21, and then supplied to a variable length decoder circuit 22 as encoded data. The variable length decoder circuit 22 variable-length-decodes the encoded data supplied from the reception buffer 21, and outputs a motion vector and a prediction mode to a motion compensation circuit 27 and a quantization step to a dequantization circuit 23, respectively, and outputs decoded quantized data to a dequantization circuit 23.

The dequantization circuit 23 dequantizes the quantized data supplied from the variable length decoder circuit 22 in accordance with the quantization step supplied likewise from the variable length decoder circuit 22, and outputs the output data (a DCT coefficient derived by the dequantization) to an IDCT circuit 24. The output data (DCT coefficient) outputted from the dequantization circuit 23 is subjected to inverse DCT processing in the IDCT circuit 24, and output data (difference data) is supplied to a calculation circuit 25.

When the output data outputted from the IDCT circuit 24 is data on a I-picture, its output data is outputted from the calculation circuit 25 as image data, and supplied to and stored in a group of frame memories 26 for producing predicted image data for image data (data on a P- or B-picture) subsequently inputted to the calculation circuit 25. The image data is also outputted as it is to the outside as a reproduced image. On the other hand, when the data outputted from the IDT circuit 24 is a P- or B-picture, the motion compensation circuit 27 produces predicted image data from image data stored in the frame memory in accordance with a motion vector and a prediction mode supplied from the variable length decoder circuit 22, and outputs the predicted image data to the calculation circuit 25. The calculation circuit 25 adds the output data (difference data) inputted from the IDCT circuit 24 and the predicted image data supplied from the motion compensation circuit 27 to derive output image data. With a P-picture, on the other hand, the output data of the calculation circuit 25 is stored in the group of frame memories 26 as predicted image data, and used as a reference image for an image signal to be next decoded.

Other than MP@ML, a variety of profiles and levels are defined in the MPEG, and a variety of tools have been provided therefor. A scalability is one of such tools. Also, a scalable encoding scheme has been introduced into the MPEG for realizing a scalability corresponding to different image sizes and frame rates. For example, with a spatial scalability, an image signal of a smaller image size is decoded when a bitstream of a lower layer is only decoded, while an image signal of a larger image size is decoded when bitstreams of a lower layer and an upper layer are decoded.

An encoder for spatial scalability will be described with reference to FIG. 17. With the spatial scalability, a lower layer corresponds to an image signal of a smaller image size, while an upper layer corresponds to an image signal of a larger image size.

An image signal of the lower layer is first inputted to a group of frame memories 1, and encoded in a manner similar to MP@ML. Output data of a calculation circuit 10, however, is supplied to a group of frame memories 11 and used not only as predicted image data for the lower layer but also is used for predicted image data for the upper layer after it is enlarged to the same image size as the image size of the upper layer by an image enlarging circuit 31.

An image signal of the upper layer is first inputted to a group of frame memories 51. A motion vector detector circuit 52 determines a motion vector and a prediction mode in a manner similar to MP@ML. A motion compensation circuit 62 produces predicted image data in accordance with the motion vector and the prediction mode determined by the motion vector detector circuit 52, and outputs the predicted image data to a weighting circuit 34. The weighting circuit 34 multiplies the predicted image data by a weight W, and outputs the weighted predicted image data to a calculation circuit 33.

The output data (image data) of the calculation circuit 10 is inputted to the group of frame memories 11 and the image enlarging circuit 31, as mentioned above. The image enlarging circuit 31 enlarges the image data produced by the calculation circuit 10 to produce the same size as the image size of the upper layer, and outputs the enlarged image data to the weighting circuit 32. The weighting circuit 32 multiplies the output data from the image enlarging circuit 31 by a weight (1-W), and outputs the resulting data to the calculation circuit 33 as weighted predicted image data.

The calculation circuit 33 adds the output data of the weighting circuit 32 and the output data of the weighting circuit 34, and outputs the resulting data to a calculation circuit 53 as predicted image data. The output data of the calculation circuit 33 is also inputted to a calculation circuit 60, added to output data of an inverse DCT circuit 59, and then inputted to a group of frame memories 61. Afterwards, the output data is used as a prediction reference data frame for image data to be encoded. The calculation circuit 53 calculates the difference between image data to be encoded and the output data (predicted image data) of the calculation circuit 33, and outputs this as difference data. However, with an intraframe encoded macroblock, the calculation circuit 53 outputs image data to be encoded as it is to a DCT circuit 54.

The DCT circuit 54 applies DCT (discrete cosine transform) processing to the output data of the calculation circuit 53 to produce a DCT coefficient, and outputs the DCT coefficient to a quantization circuit 55. The quantization circuit 55, as is the case of MP@ML, quantizes the DCT coefficient in accordance with a quantization scale determined by the amount of data stored in a transmission buffer 57 or the like, and outputs quantized data to a variable length encoder circuit 56. The variable length encoder circuit 56 variable-length-encodes the quantized data (quantized DCT coefficient), and then outputs this through the transmission buffer 57 as a bitstream for the upper layer.

The output data of the quantization circuit 55 is also dequantized by a dequantization circuit 58 with the quantization scale used in the quantization circuit 55. Output data (a DCT coefficient derived by dequantization) of the dequantization circuit 8 is supplied to the IDCT circuit 59, subjected to inverse DCT processing in the IDCT circuit 59, and then inputted to the calculation circuit 60. The calculation circuit 60 adds the output data of the calculation circuit 33 and the output data (difference data) of the inverse DCT circuit 59, and inputs the output data to the group of frame memories 61.

The variable length encoder circuit 56 is also fed with the motion vector and the prediction mode detected by the motion vector detector circuit 52, the quantization scale used in the quantization circuit 55, and the weight W used in the weighting circuits 34 and 32, each of which is encoded and supplied to the buffer 57 as encoded data. The encoded data is transmitted through the buffer 57 as a bitstream.

Next, an example of a decoder for spatial scalability will be described with reference to FIG. 18. A bitstream of a lower layer, after inputted to a reception buffer 21, is decoded in a manner similar to MP@ML. Output data of a calculation circuit 25 is outputted to the outside, and also stored in a group of frame memories 26 not only for use as predicted image data for an image data to be subsequently decoded but also for use as predicted image data for an upper layer after it is enlarged by the image signal enlarging circuit 81 to the same image size as an image signal of the upper layer.

A bitstream of the upper layer is supplied to a variable length decoder circuit 72 through a reception buffer 71, and a variable length code is decoded. At this time, a quantization scale, a motion vector, a prediction mode and a weighting coefficient are decoded together with a DCT coefficient. Quantized data decoded by the variable length decoder circuit 72 is dequantized in the dequantization circuit 73 using the decoded quantization scale, and then the DCT coefficient (the DCT coefficient derived by dequantization) is supplied to an IDCT circuit 74. Then, the DCT coefficient is subjected to inverse DCT processing by the IDCT circuit 74, and then output data is supplied to a calculation circuit 75.

A motion compensation circuit 77 produces predicted image data in accordance with the decoded motion vector and prediction mode, and inputs the predicted image data to the weighting circuit 84. The weighting circuit 84 multiplies the output data of the motion compensation circuit 77 by the decoded weight W, and outputs the weighted output data to a calculation circuit 83.

The output data of the calculation circuit 25 is outputted as reproduced image data for the lower layer, outputted to the group of frame memories 26 and simultaneously enlarged by an image signal enlarging circuit 81 to the same image size as the image size of the upper layer, and outputted to a weighting circuit 28. The weighting circuit 82 multiplies output data of the image signal enlarging circuit 81 by (1-W) using the decoded weight W, and outputs the weighted output data to the calculation circuit 83.

The calculation circuit 83 adds the output data of the weighting circuit 84 and the output data of the weighting circuit 82, and outputs the addition result to the calculation circuit 75. The calculation circuit 75 adds the output data of the IDCT circuit 74 and the output data of the calculation circuit 83, outputs the addition result as a reproduced image for the upper layer, and also supplies it to the group of frame memories 76 for later use as predicted image data for image data to be decoded.

While the processing for a luminance signal has been heretofore described, color difference signals are also processed in a similar manner. In this case, however, a motion vector used therefor is such one that is derived by dividing the motion vector for a luminance signal by two in the vertical direction and in the horizontal direction. While the MPEG scheme has been described above, a variety of other high efficient coding schemes have been standardized for motion pictures. For example, ITU-T defines schemes called H.261 and H262 mainly for coding schemes directed to communications. Each of these H.261 and H263 is a combination of motion compensation differential pulse code modulation and DCT transform encoding basically similar to the MPEG scheme, so that a similar encoder and decoder may be used though details such as header information are different.

Further, in the MPEG scheme described above, a new efficient coding scheme called MPEG4 has been in course of standardization for motion picture signals. A significant feature of the MPEG4 lies in that an image can be encoded in units of objects (an image is divided into a plurality of subimages for encoding), and processed. On the decoding side, image signals of respective objects, i.e., a plurality of image signals are synthesized to reconstruct a single image.

An image synthesizing system for synthesizing a plurality of images into a single image employs, for example, a method called a chroma key. This is a method which captures a predetermined object before a background in a particular uniform color such as blue, extracts a region other than the blue background, and synthesizes the extracted region in another image. A signal indicative of the extracted region in this event is called a Key signal.

Next, a method of encoding a synthesized image will be explained with reference to FIG. 19. An image F1 represents a background, while an image F2 represents a foreground. The foreground F2 is an image produced by capturing an image in front of a background in a particular color, and extracting a region other than the background in that color. In this event, a signal indicative of the extracted region is a Key signal K1. A synthesized image F3 is synthesized by these F1, F2, K1. For encoding this image, F3 is typically encoded as it is in accordance with a coding scheme such as the MPEG. In this event, information such as the Key signal is lost, so that re-editing and re-synthesis of the images, such as changing only the background F1 with the foreground F2 maintained unchanged, are difficult.

On the other hand, it is also possible to construct a bitstream of an image F3 by individually encoding the images F1, F2 and the Key signal K1 and multiplexing respective bitstreams, as illustrated in FIG. 20.

FIG. 21 illustrates a method of producing a synthesized image F3 by decoding a constructed bitstream in the manner shown in FIG. 20. The bitstream is demultiplexed into decomposed bitstreams F1, F2 and K1, each of which is decoded to produce decoded images F1', F2' and a decoded Key signal K1'. In this event, F1' and F2' can be synthesized in accordance with the Key signal K1' to produce a decoded synthesized image F3'. In this case, re-editing and re-synthesis, such as changing only the background F1 with the foreground F2 maintained unchanged in the same bitstream, can be carried out.

In the MPEG4, respective image sequences such as the images F1, F2 composing a synthesized images, as mentioned above, are called a VO (Video Object). Also, an image frame of a VO at a certain time is called a VOP (Video Object Plane). The VOP is composed of luminance and color difference signals and a Key signal. An image frame refers to an image at a predetermined time, and an image sequence refers to a collection of image frames at different times. In other words, each VO is a collection of VOPs at different times. Respective VOs have different sizes and positions depending on the time. That is, even VOPs belonging to the same VO may differ in size and position.

FIGS. 22 and 23 illustrate the configurations of an encoder and a decoder for encoding and decoding an image in units of objects, as mentioned above. FIG. 22 illustrates an example of an encoder. An input image signal is first inputted to a VO composition circuit 101. The VO composition circuit 101 divides the input image into respective objects, and outputs image signals representative of the respective objects (VOs). Each image signal representative of a VO is composed of an image signal and a Key signal. The image signals outputted from the VO composition circuit 101 are outputted on a VO-by-VO basis to VOP composition circuits 102-0 to 102-n, respectively. For example, an image signal and a Key signal of VO0 are inputted to the VOP composition circuit 102-0; an image signal and a Key signal of VO1 are inputted to the VOP composition circuit 102-1; and subsequently, an image signal and a Key signal of VOn are inputted to the VOP composition circuit 102-n in a similar manner.

In the VO composition circuit 101, for example, when an image signal is produced from a chroma key as illustrated in FIG. 20, its VO is composed of respective image signals and a Key signal as they are. For an image which lacks a Key signal or has lost a Key signal, the image is divided into regions, a predetermined region is extracted, and a Key signal is produced to compose a VO. Each of the VOP composition circuits 102-0 to 102-n extracts from an associated image frame a minimum rectangular portion including an object within the image. In this event, however, the numbers of pixels in the rectangular portion should be multiples of 16 in the horizontal and vertical directions. Each of the VOP composition circuits 102-0 to 102-n extracts image signals (luminance and color difference signals) and a Key signal from the above-mentioned rectangle, and outputs them. A flag indicative of the size of each VOP (VOP Size) and a flag indicative of the position of the VOP at absolute coordinates (VOP POS) are also outputted. Output signals of the VOP composition circuits 102-0 to 102-n are inputted to VOP encoder circuits 103-0 to 103-n, respectively, and encoded outputs of the VOP encoder circuits 103-0 to 103-n are inputted to a multiplexer circuit 104 and assembled into a single bitstream which is outputted to the outside as a bitstream.

FIG. 23 illustrates an example of a decoder. A multiplexed bitstream is demultiplexed by a demultiplexer circuit 111 into decomposed bitstreams of respective VOs. The bitstreams of respective VOs are inputted to and decoded in VOP decoder circuits 112-0 to 112-n, respectively. Each of the VOP decoder circuits 112-0 to 112-n decodes image signals and a Key signal, a flag indicative of the size (VOP Size), and a flag indicative of the position at absolute coordinates (VOP POS) of an associated VOP, and inputs them to an image reconstruction circuit 113. The image reconstruction circuit 113 uses the image signals, key signals, flags indicative of the sizes (VOP Size), and flags indicative of the positions at absolute coordinates (VOP POS) of respective VOPs to synthesize an image, and outputs a reproduced image. Next, an example of the VOP encoder circuit 103-0 (the remaining VOP encoder circuits 103-1 to 103-n are configured in a similar manner) will be described with reference to FIG. 24. Image signals and a Key signal composing each VOP are inputted to an image signal encoder circuit 121 and a Key signal encoder circuit 122, respectively. The image signal encoder circuit 121 performs encoding processing, for example, in accordance with a scheme such as the MPEG scheme and H.263. The Key signal encoder circuit 122 performs encoding processing, for example, in accordance with DPCM or the like. In addition, for encoding the Key signal, there is also a method by which motion compensation is performed using a motion vector detected by the image signal encoder circuit 121 to encode a differential signal. The amount of bits generated by the Key signal encoding is inputted to the image signal encoder circuit 121 such that a predetermined bit rate is reached.

A bitstream of encoded image signals (a motion vector and texture information) and a bitstream of a Key signal are inputted to a multiplexer circuit 123 which multiplexes them into a single bitstream and outputs the multiplexed bitstream through a transmission buffer 124.

FIG. 25 illustrates an exemplary configuration of the VOP decoder circuit 112-0 (the remaining VOP decoder circuits 112-1 to 112-n are configured in a similar manner). A bitstream is first inputted to a demultiplexer circuit 131 and decomposed into a bitstream of image signals (a motion vector and texture information) and a bitstream of a Key signal which are decoded respectively by an image signal decoder circuit 132 and a Key signal decoder circuit 133. In this event, when the Key signal has been encoded by motion compensation, the motion vector decoded by the image signal decoder circuit 132 is inputted to the Key signal decoder circuit 133 for use in decoding.

While a method of encoding an image on a VOP-by-VOP basis has been described above, such a scheme is now in course of standardization as the MPEG4 in ISO-IEC/JTC1/SC29/WG11. A method of efficiently encoding respective VOPs as mentioned above has not been well established at present, and moreover, functions such as the scalability have not been well established at present.

In the following, description will be made on a method of scalable-encoding an image in units of objects. As mentioned above, the rendering circuit 155 maps a texture stored in the memory 152 irrespective of whichever format, a motion picture or a still image, and its contents. Only one texture stored in the memory can be mapped to a polygon at any time, so that a plurality of textures cannot be mapped to a pixel. In many cases, an image is transmitted in a compressed form, so that a compressed bitstream is decoded on a terminal side, and then stored in a predetermined memory for texture mapping.

In the prior art, only one image signal is produced at any time by decoding a bitstream. For example, when a bitstream in accordance with MP@ML in the MPEG is decoded, a single image sequence is decoded. Also, with the scalability in the MPEG2, an image of a low image quality is produced when a bitstream of a lower layer is decoded, while an image signal of a high image quality is produced when bitstreams of lower and upper layers are decoded. In any case, one image sequence is decoded as a consequence.

A different situation occurs, however, in the case of a scheme such as the MPEG4 which codes an image in units of objects. More specifically, a single object may be composed of a plurality of bitstreams, in which case, a plurality of images may be produced for each bitstream. Therefore, a texture cannot be mapped to a three-dimensional object described in the VRML or the like. As a method of solving this problem, it is contemplated that one VRML node (polygon) is allocated to one image object (VO). For example, it can be thought, in the case of FIG. 21, that the background F' is allocated to one node, and the foreground F2' and the Key signal K1' are allocated to one node. However, when one image object is composed of a plurality of bitstreams so that a plurality of images are produced therefrom when decoded, the following problem arises. This problem will be explained with reference to FIGS. 26 to 31. Three-layer scalable encoding is taken as an example. In the three-layer scalable encoding, two upper layers, i.e., a first upper layer (an enhancement layer 1. hereinafter called the upper layer 1 as appropriate) and a second upper layer (an enhancement layer 2. hereinafter called the upper layer 2 as appropriate) exist in addition to a lower layer (base layer). In comparison with an image produced by decoding up to the first upper layer, an image produced by decoding up to the second upper layer has an improved image quality. Here, the improved image quality refers to a spatial resolution in the case of the spatially scalable encoding; a frame rate in the case of temporally scalable encoding; and SNR (Signal to Noise Ratio) of an image in the case of SNR scalable encoding.

In the MPEG4 which encodes an image in units of objects, the relationship between the first upper layer and the second upper layer is defined as follows: (1) the second upper layer includes an entire region of the first upper layer; (2) the second upper layer corresponds to a portion of a region of the first upper layer; and (3) the second upper layer corresponds to a region wider than the first upper layer. The relation (3) exists when the scalable encoding is performed for three or more layers. This is the case where the first upper layer corresponds to a portion of a region of the lower layer, and the second upper layer includes an entire region of the lower layer, or the case where the first upper layer corresponds to a portion of the region of the lower layer, and the second upper layer corresponds to a region wider than the first upper layer, and corresponds to a portion of the region of the lower layer. In the relation (3), when decoding up to the first upper layer, the image quality is improved only in a portion of the image of the lower layer; and when decoding up to the second upper layer, the image quality is improved in a wider area or over the entire region of the image of the lower layer. In the relation (3), a VOP may have a rectangular shape or any arbitrary shape.

FIGS. 26 to 31 illustrate an example of three-layer spatially scalable encoding. FIG. 26 illustrates an example of a spatial scalability in the relation (1), wherein VOPs are all rectangular in shape. FIG. 27 illustrates an example of a spatial scalability in the relation (2), wherein VOPs are rectangular in shape. FIG. 28 illustrates an example of a spatial scalability in the relation (3), wherein VOPs of all layers are rectangular in shape. FIG. 29 illustrates an example of a spatial scalability in the relation (3), wherein a VOP of the first upper layer is arbitrary in shape, and VOPs of the lower layer and the second upper layer are rectangular in shape. FIGS. 30 and 31 each illustrate an example of a spatial scalability in the relation (1), wherein VOPs are rectangular and arbitrary in shape, respectively.

Here, as illustrated in FIG. 26, when the image quality of an entire image is improved, the image having the highest image quality is only required to be displayed as is the case of the scalable encoding such as the conventional MPEG2. However, the cases as illustrated in FIGS. 27, 28 and 29 may exist in the MPEG4 which codes an image in units of objects. For example, in the case of FIG. 27, when bitstreams on the lower layer and the upper layers 1, 2 are decoded, the resolutions of images of the lower layer and the upper layer 1 are converted, and two image sequences after the resolution conversion are synthesized with a decoded image sequence of the upper layer 2 to reconstruct an entire image. Also, in the case of FIG. 29, the upper layer 1 and the lower layer may only be decoded, with an image of the upper layer 1 being only outputted for synthesis with another image sequence decoded from another bitstream.

As described above, the coding of an image in units of objects implies a problem in that only a method of simply allocating one node to one object becomes incapable of mapping an image to an object as a texture if a plurality of images are produced for one object.

DISCLOSURE OF THE INVENTION

The present invention has been made in view of the situation as mentioned above, and is intended to ensure that an image can be mapped to an object as a texture even when a plurality of images are produced for one object.

An image signal multiplexing apparatus and method, and a program for multiplexing image signals to be transmitted through a transmission medium in the present invention are adapted to select spatial configuration information for describing a predetermined object and for selecting streams constituting the predetermined object from among a plurality of layers of bitstreams having different qualities, produce information related to the object composed of the bitstreams selected by the selecting means, and multiplex the selected spatial configuration information, the selected bitstreams, and the produced information on the object to output the multiplexed information.

Also, an image signal multiplexing apparatus and method, and a transmission medium for transmitting a program for multiplexing image signals to be transmitted through the transmission medium in the present invention are adapted to output spatial configuration information for describing a predetermined object, a plurality of layers of bitstreams having different qualities and composing the predetermined object, and information related to the object including at least dependency information representative of a dependency relationship between different bitstreams, and multiplex the outputted spatial configuration information, plurality of layers of bitstreams, and information related to the object to output the multiplexed information.

Further, an image signal demultiplexing apparatus and method for separating a multiplexed image signal into respective signals, and a program for separating a multiplexed signal transmitted through a transmission medium into respective signals are adapted to separate, from a multiplexed bitstream having multiplexed therein spatial configuration information for describing an object, a plurality of layers of bitstreams having different qualities and composing the object, and information related to the object, the spatial configuration information for describing the object, the plurality of layers of bitstreams composing the object, and the information related to the object, respectively, analyze the spatial configuration information, decode the plurality of layers of bitstreams, mix output signals corresponding to the same object within the decoded output signals, and reconstruct an image signal from the analyzed output data and the mixed output data based on the information related to the object.

Also, an image signal demultiplexing apparatus and method for separating a multiplexed image signal into respective signals, and a program for separating a multiplexed image signal transmitted through a transmission medium into respective image signal in the present invention are adapted to separate, from a transmitted multiplexed bitstream having multiplexed therein spatial configuration information for describing an object, a plurality of layers of bitstreams having different qualities and composing the object, and dependency information indicative of a dependency relationship of information between the different bitstreams, the spatial configuration information for describing the object, the plurality of layers of bitstreams composing the object, and the information related to the object, control to select spatial configuration information for describing a predetermined object, and the plurality of layers of bitstreams composing the object based on a selecting signal and the dependency information, analyze the selected spatial configuration information, decode the plurality of layers of bitstreams, mix output signals corresponding to the same object within the decoded output signals, and reconstruct an image signal from the analyzed output data and the mixed output signal based on the information related to the object.

BRIEF DESCRIPTION OF DRAWINGS

FIG. 7 is a diagram showing the structure of an object descriptor;

FIG. 8 is a diagram showing the structure of ES_Descriptor;

FIG. 9 is a diagram showing the structure of ESConFig-Params;

FIG. 10 is a diagram showing the structure of a scene descriptor for a motion picture;

FIG. 11 is a diagram showing the structure of a scene descriptor for a still image;

FIG. 13 is a diagram showing the structure of ES_Descriptor;

FIG. 27 is a diagram for explaining image objects;

FIG. 31 is a diagram for explaining image objects;

BEST MODE FOR IMPLEMENTING THE INVENTION

One embodiment of the present invention will hereinafter be described in detail with reference to the accompanying drawings.

First, a bitstream multiplexing apparatus and a demultiplexing apparatus according to a first embodiment will be described with reference to FIG. 1. In the following, description is made on the assumption that encoded audio and video streams (Elementary Stream (ES)) have been previously recorded in a predetermined storage device 202. However, such bitstreams may be directly inputted from video and audio encoders to a multiplexer circuit 203 instead of through the storage device 202. Also, while the following description is made assuming that the MPEG4 scheme is employed for an encoding and decoding scheme, the present invention is applicable to any schemes in a similar manner as long as they divide an image into a plurality of subimages for encoding.

The storage device 202 has previously recorded therein bitstreams ES (Elementary Stream) corresponding to respective AV (audio and video) objects; object stream information OI required to decode respective bitstreams; and scene descriptors (Scene Descriptor) for describing two-dimensional and three-dimensional scenes (virtual spaces defined by images to be transmitted). Here, the object stream information OI includes, for example, a buffer size required for decoding, a time stamp for each access unit (frame or VOP), and so on. Its details will be described later.

The object information OI describes all information on a bitstream ES corresponding to each AV (audio and video) object. An object description generator circuit 204 generates an object descriptor OD (Object Descriptor) corresponding to the OI supplied from the storage device 202.

The multiplexer circuit 203 multiplexes, in a predetermined order, bitstreams ES and scene descriptors SD recorded in the storage device 202 and object descriptors ODs supplied from the object descriptor generator circuit 204 to transmit a multiplexed bitstream FS.

Figure 21:
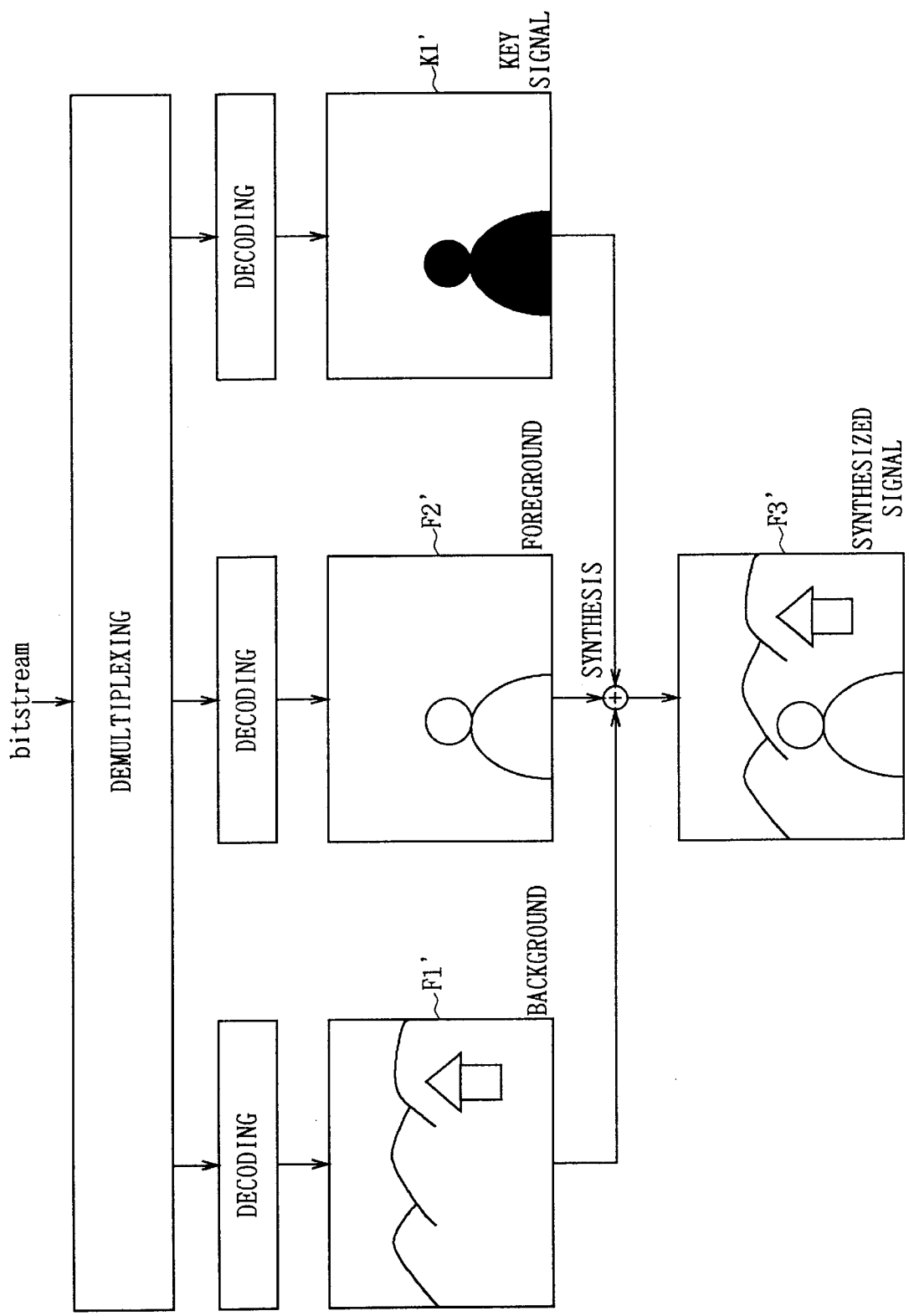
FIG. 21 is a diagram for explaining how images are synthesized.
Figure 22:
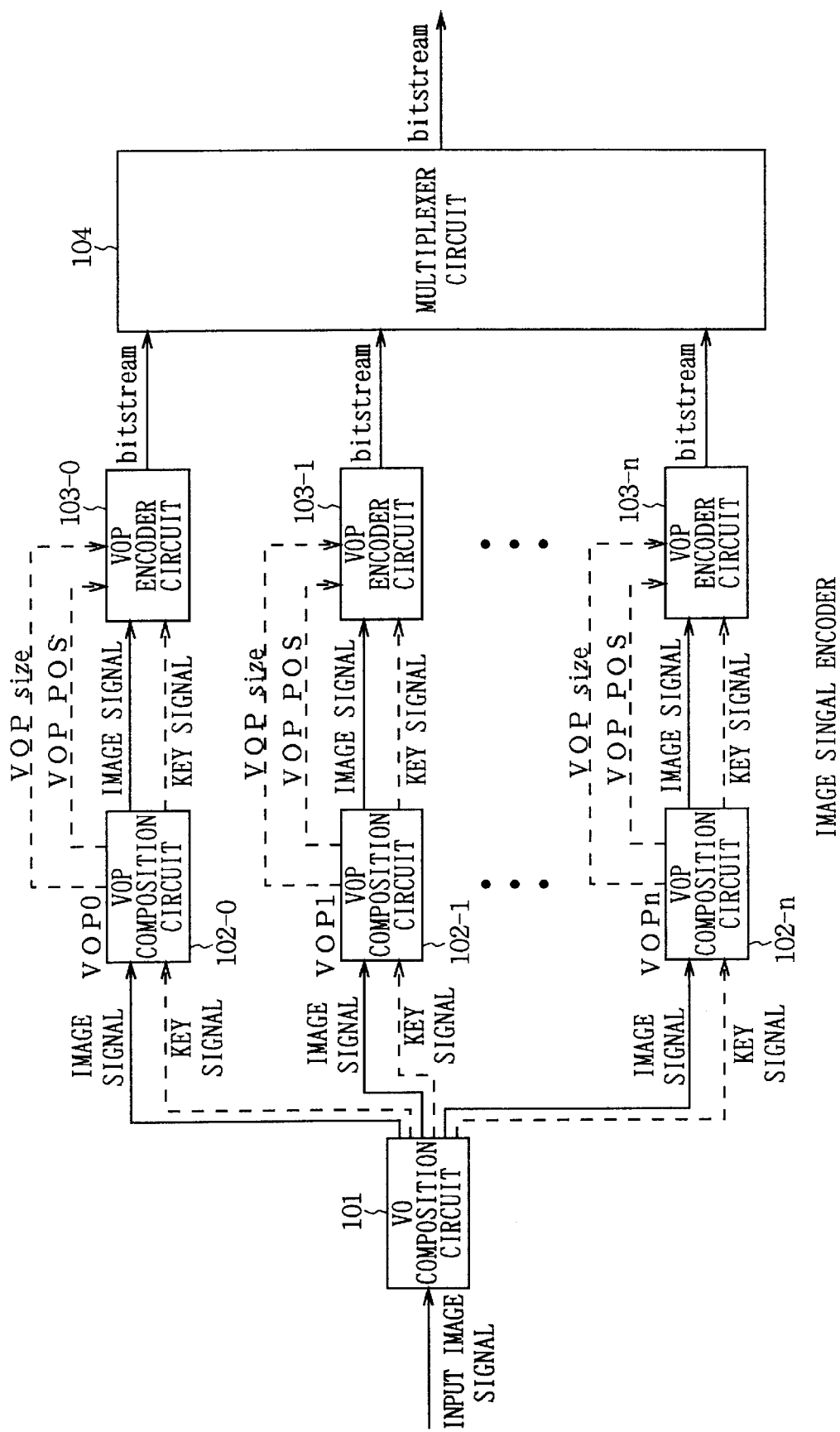
FIG. 22 is a block diagram illustrating a further exemplary configuration of a conventional image signal encoder.
Figure 23:
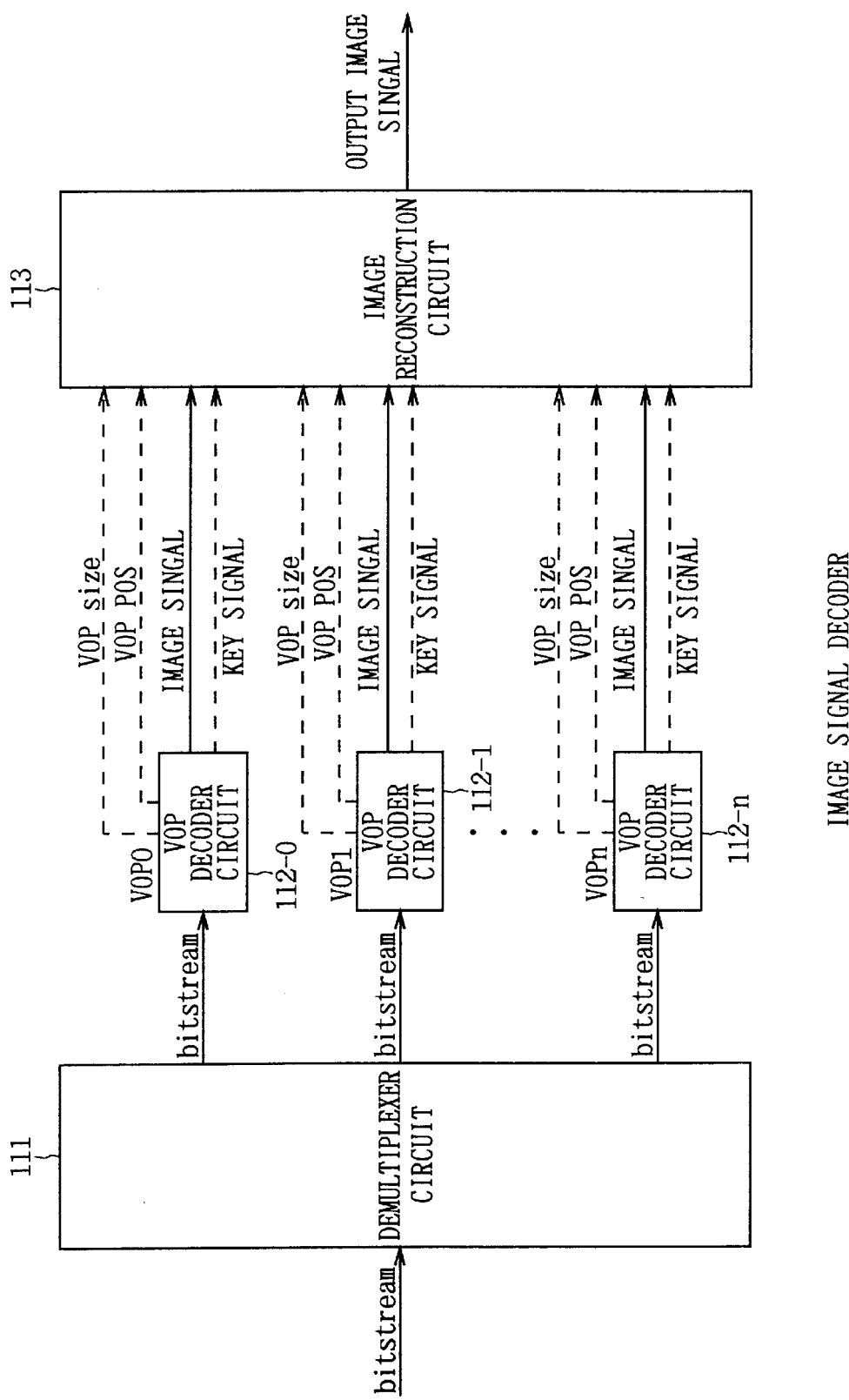
FIG. 23 is a block diagram illustrating a further exemplary configuration of a conventional image signal decoder.
Figure 24:
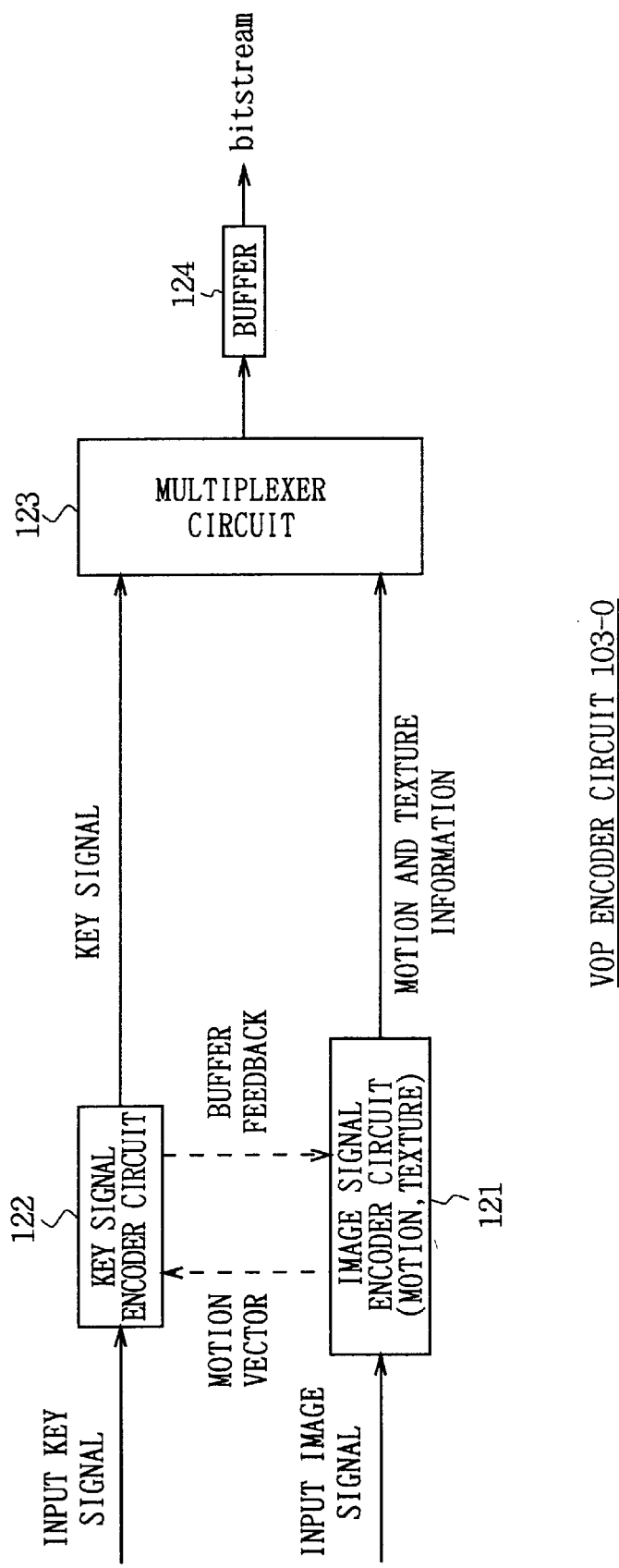
FIG. 24 is a block diagram illustrating an exemplary configuration of a VOP encoder circuit 103-0 in FIG. 22.
Figure 25:
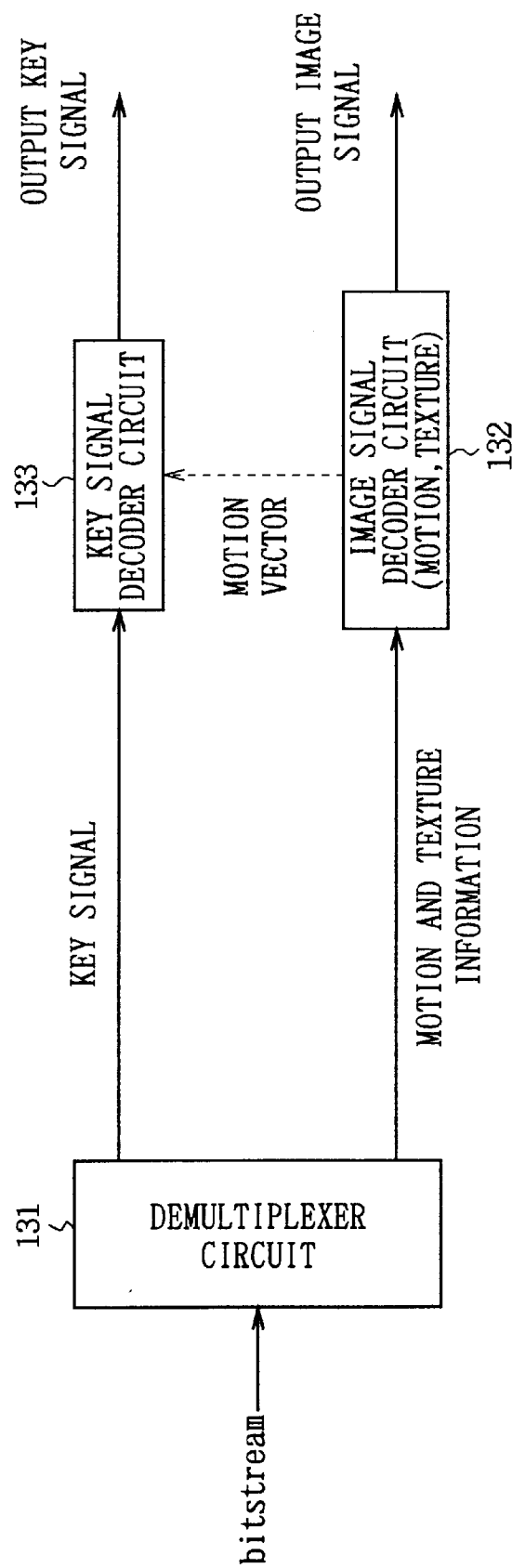
FIG. 25 is a block diagram illustrating an exemplary configuration of a VOP decoder circuit 112-0 in FIG. 23.
Figure 26:
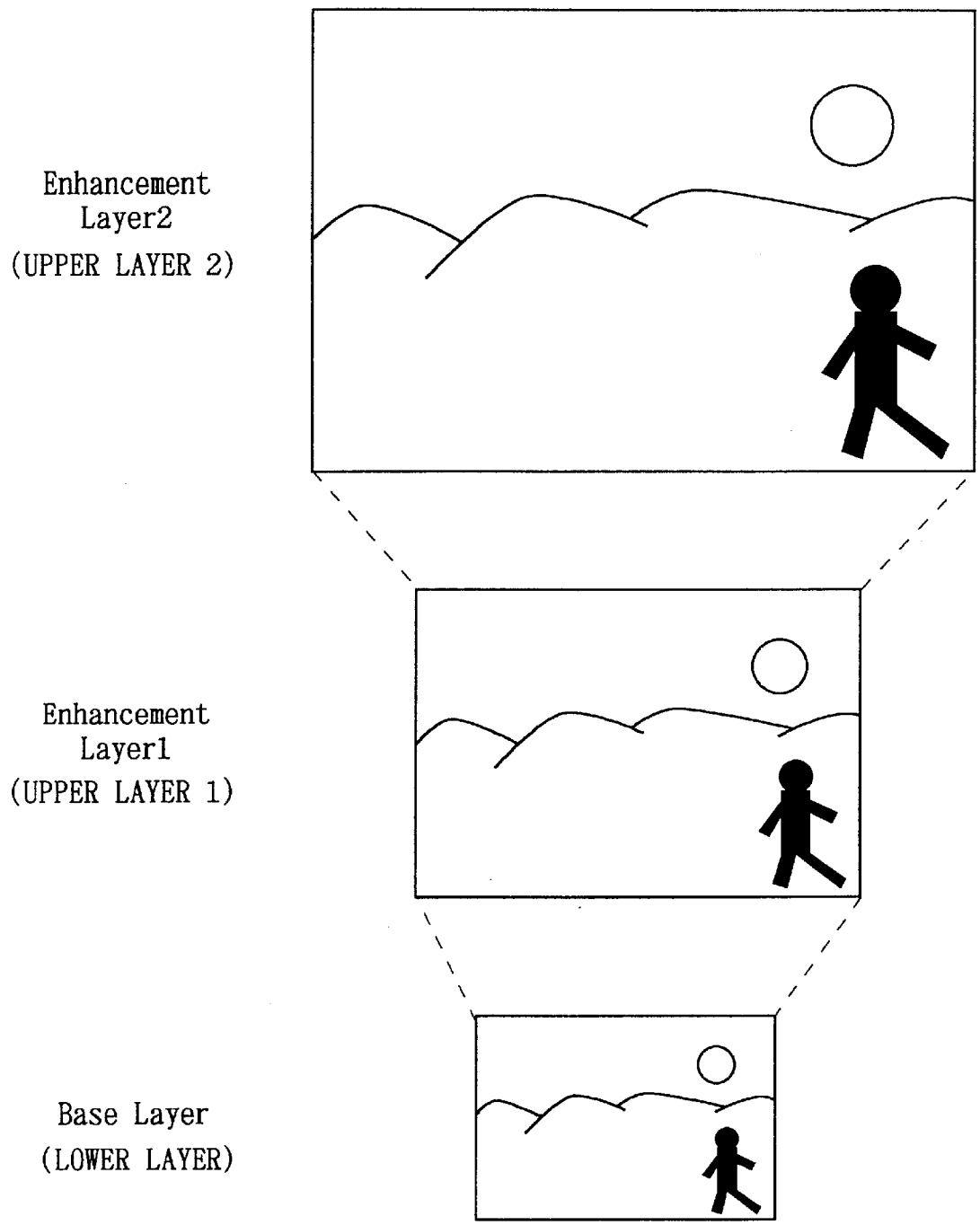
FIG. 26 is a diagram for explaining image objects.
Figure 28:
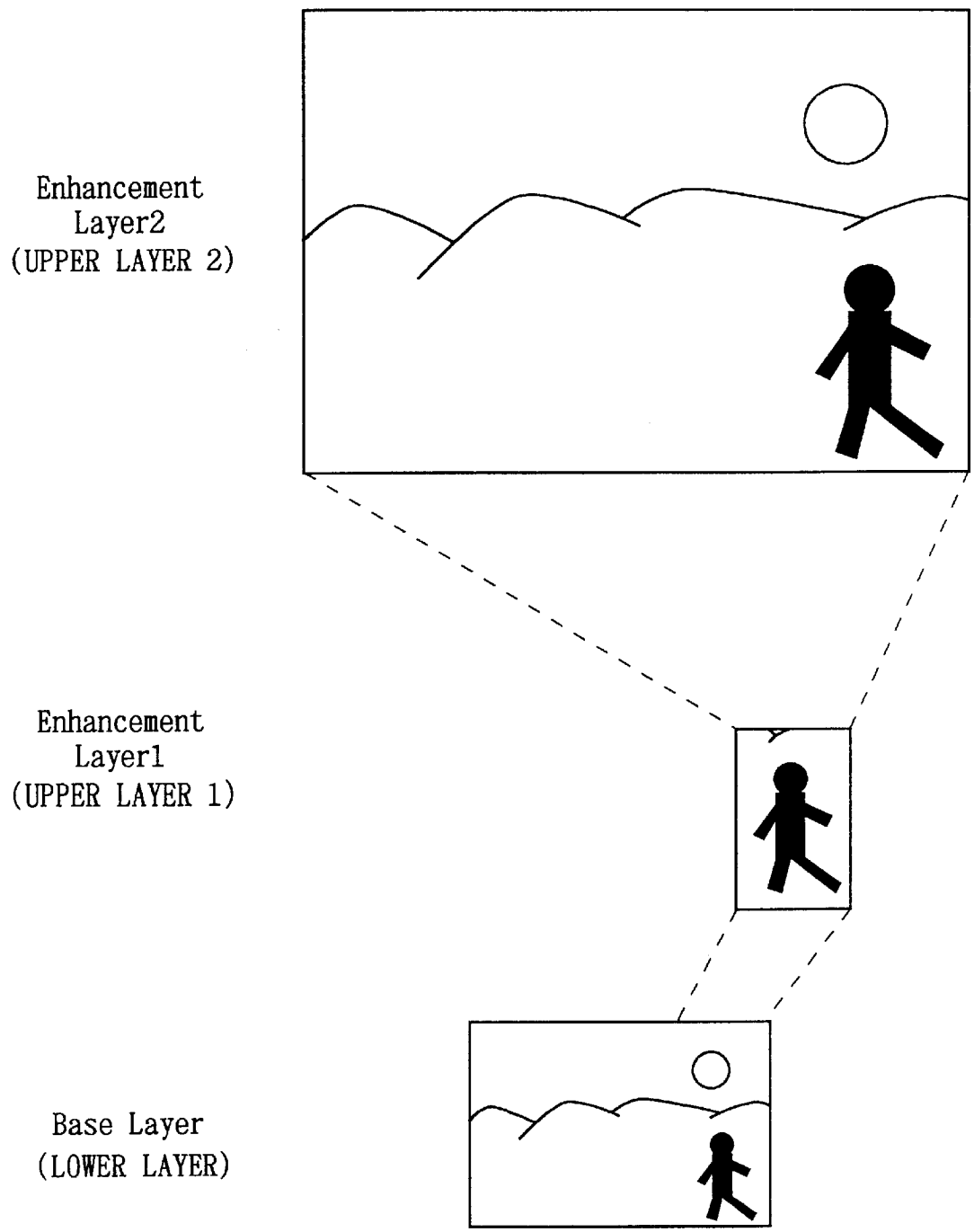
FIG. 28 is a diagram for explaining image objects.

Here, description is made on the structure of a bitstream composing each object. For example, a scene as illustrated in FIG. 21 is composed of two objects which are a background F1' and a foreground F2'. A Key signal K1' and the foreground F2' are formed of a single bitstream ES. Therefore, the scene of FIG. 21 is composed of two video objects VOs, and when scalable encoding is not employed, each VO is formed of a single bitstream ES.

Also, in cases of FIGS. 26–29, a frame is formed of a single video object VO. In these cases, however, since the scalable encoding is performed, one VO is formed of three bitstreams ESs. While FIGS. 26 to 29 illustrate examples of three-layer scalable encoding, the number of layers may be arbitrary.

Figure 30:
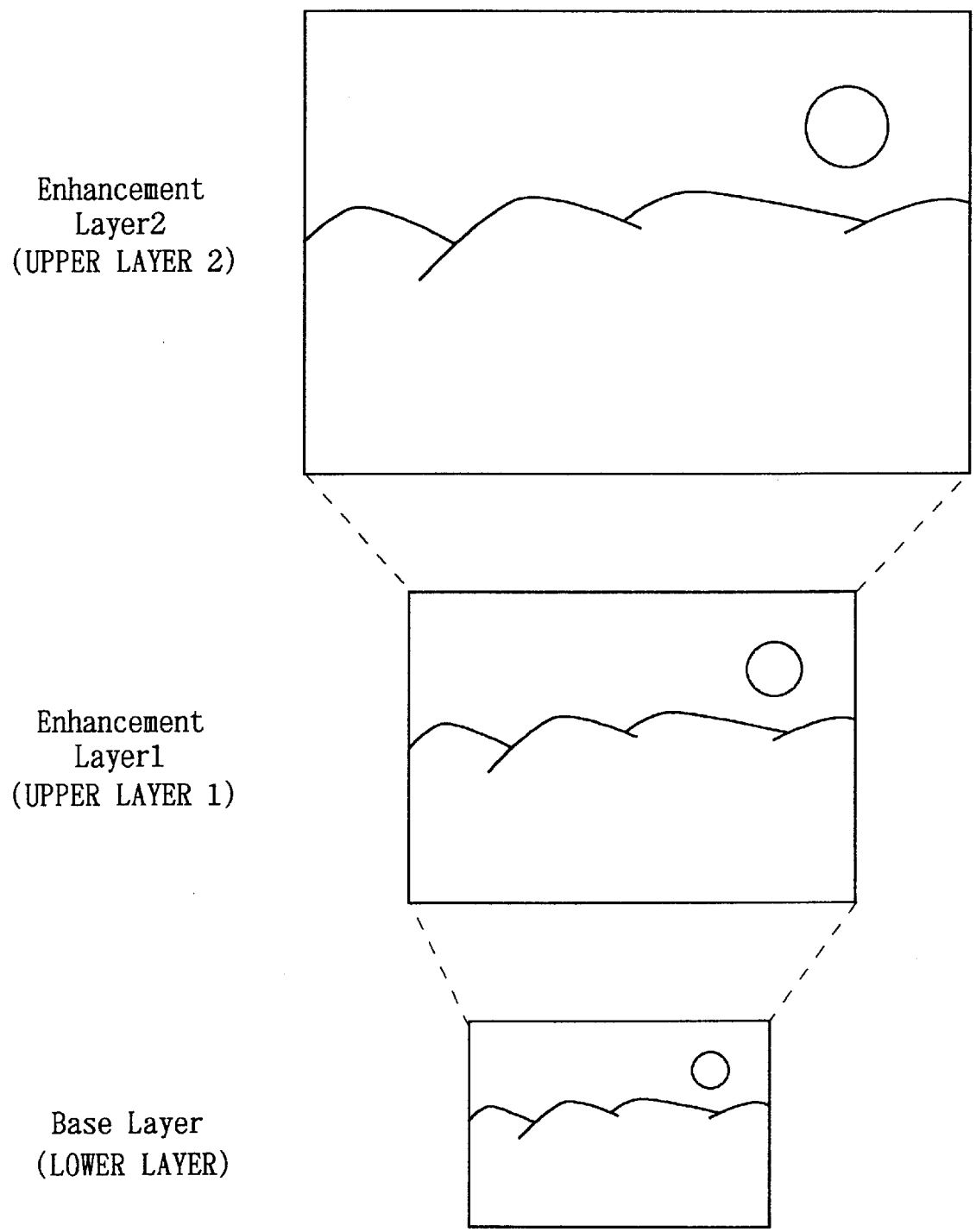
FIG. 30 is a diagram for explaining image objects.

Further, in FIGS. 30 and 31, a scene is composed of two video objects VOs which are a background (FIG. 30) and a foreground (FIG. 31), with each VO being formed of three bitstreams ESs.

The user may send a request signal from a terminal to arbitrarily set which video object is displayed, or which layer is displayed in the case of the scalable encoding.

Figure 1:
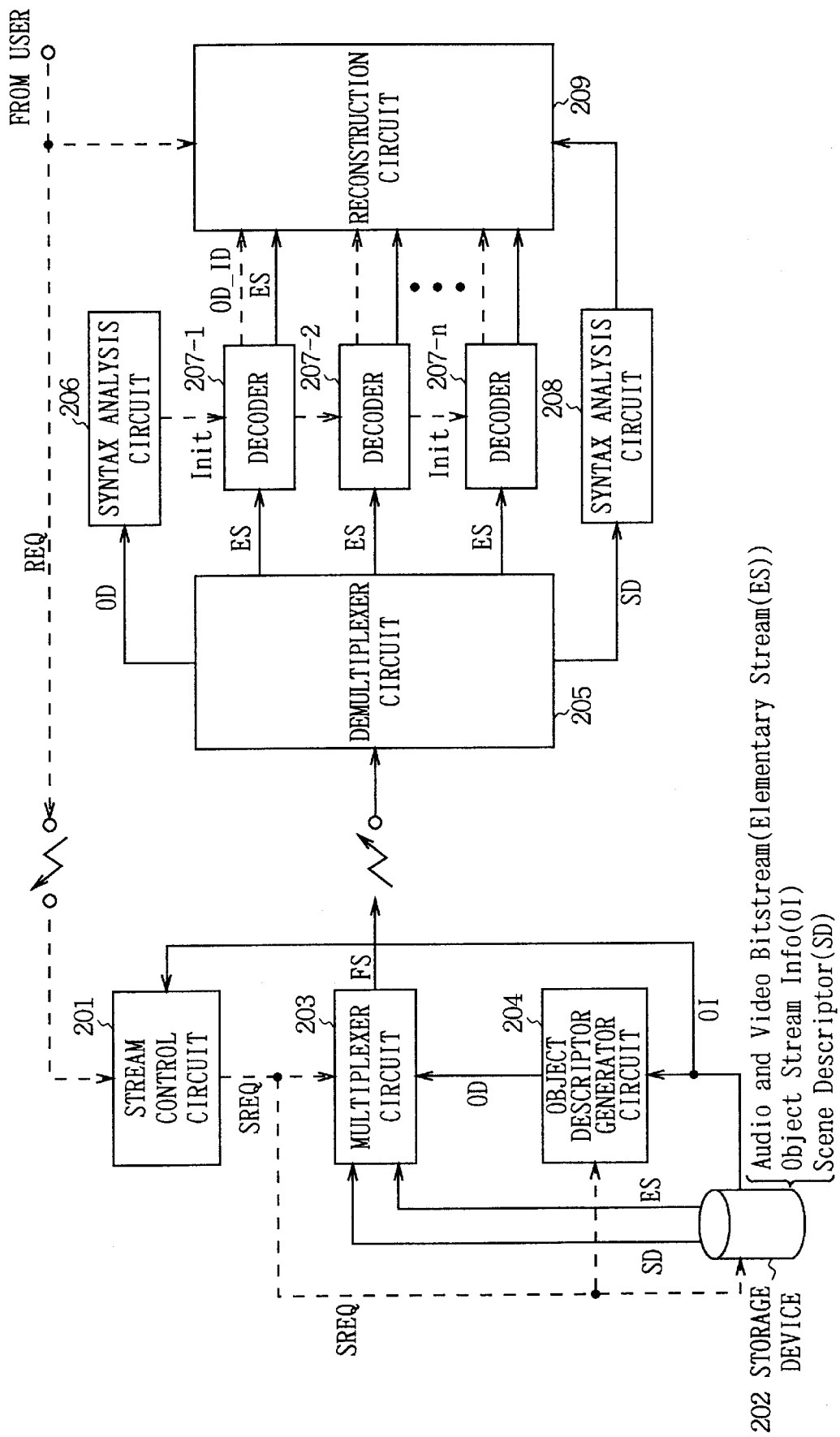
FIG. 1 is a block diagram illustrating exemplary configurations of an image signal multiplexing apparatus and an image signal demultiplexing apparatus according to the present invention.

In the embodiment illustrated of FIG. 1, the user transmits a request signal REQ for specifying required video objects and bitstreams from an external terminal, not shown, to the transmission side. The request signal REQ is supplied to a stream control circuit 201. Object stream information OI on bitstreams of each video object is recorded in the storage device 202. As mentioned above, the object stream information OI includes, for example, information such as information indicating how many bitstreams a predetermined object is formed of; information required to decode each bitstream; a buffer size; which bitstream is additionally required for decoding; and so on.

The stream control circuit 201 determines which bitstreams are to be transmitted with reference to the object stream information OI supplied from the storage device 202 in accordance with the request signal REQ, and supplies a stream request signal SREQ to the multiplexer circuit 203, the storage device 202 and the object descriptor generator circuit 204. Also, the storage device 202 reads predetermined bitstreams ES and scene descriptor SD in accordance with the stream request signal SREQ, and outputs them to the multiplexer circuit 203.

The object descriptor generator circuit 204 reads object stream information OI related to bitstreams of each object (VO) recorded in the storage device 202 in accordance with the stream request signal SREQ, and extracts only information on bitstreams requested by the stream request signal SREQ as an object descriptor OD. The object descriptor generator circuit 204 also produces an ID number OD_ID indicating which object a bitstream corresponds to, and writes the ID number OD_ID into the object descriptor OD. For example, in the case of FIG. 26, when a lower layer and an upper layer 1 are only requested for a predetermined object, the object descriptor generator circuit 204 extracts only information on the lower layer and the upper layer 1 from the object stream information OI, assigns the extracted information as an object descriptor OD, produces an ID number OD_ID indicative of its object, and writes the ID number OD_ID into the object descriptor OD. Then, the object descriptor OD produced in this manner is stored in the multiplexer circuit 203. The syntax of the object descriptor OD and the object stream information OI, and the scene descriptor SD will be described later in greater detail.

Figure 2:
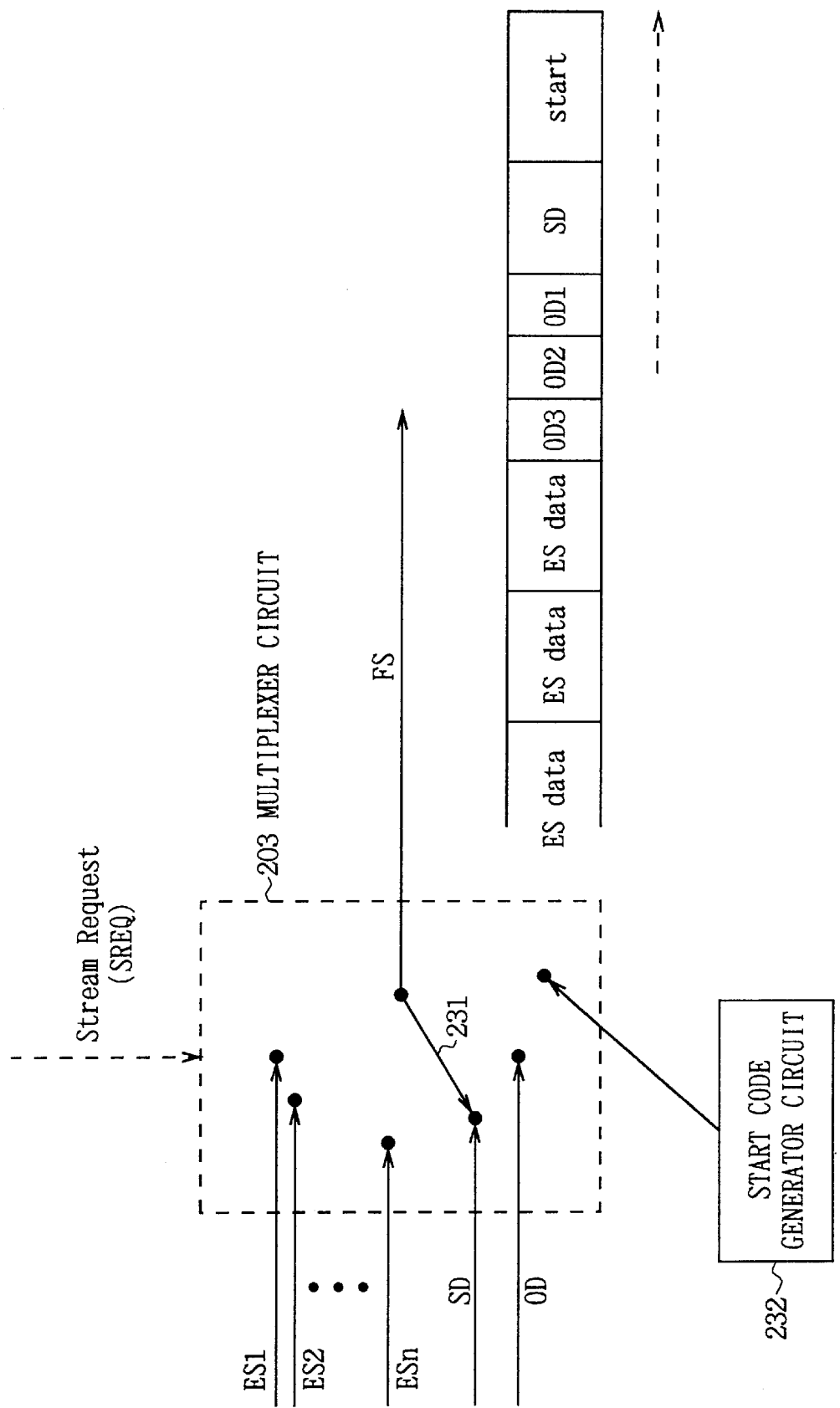
FIG. 2 is a block diagram illustrating an exemplary configuration of a multiplexer circuit 203 in FIG. 1.

Next, the operation of the multiplexer circuit 203 will be described with reference to FIG. 2. The multiplexer circuit 203 is supplied with bitstreams ES1–ESn to be transmitted in accordance with a stream request signal SREQ. The respective bitstreams ES1–ESn are supplied to a switch 231. In addition, a scene descriptor SD and object descriptors ODs are likewise supplied to the switch 231. The multiplexer circuit 203 is also provided with a start code generator circuit 232, and a start code generated in the start code generator circuit 232 is also supplied to the switch 231. The switch 231 switches a connection in a predetermined order to produce a multiplexed bitstream FS which is outputted to the outside.

As the multiplexed bitstream FS, first outputted is the start code generated in the start code generator circuit 232. Then, the connection of the switch 231 is switched to output the scene descriptor SD. After the scene descriptor SD is outputted, the connection of the switch 231 is again switched to output the object descriptors ODs. Since the number of the object descriptors ODs is equal to the number of objects, the object descriptors of the number equal to the number of associated objects are outputted. (FIG. 2 illustrates the case where the number of objects is three). After the object descriptors ODs are outputted, the connection of the switch 231 is again switched. The connection is switched for each of predetermined data sizes for outputting the bitstreams ES1–ESn, respectively, to output the respective bitstreams. The multiplexed bitstream ES is supplied to a demultiplexer circuit 5 through a transmission path, as illustrated in FIG. 1.

Figure 3:
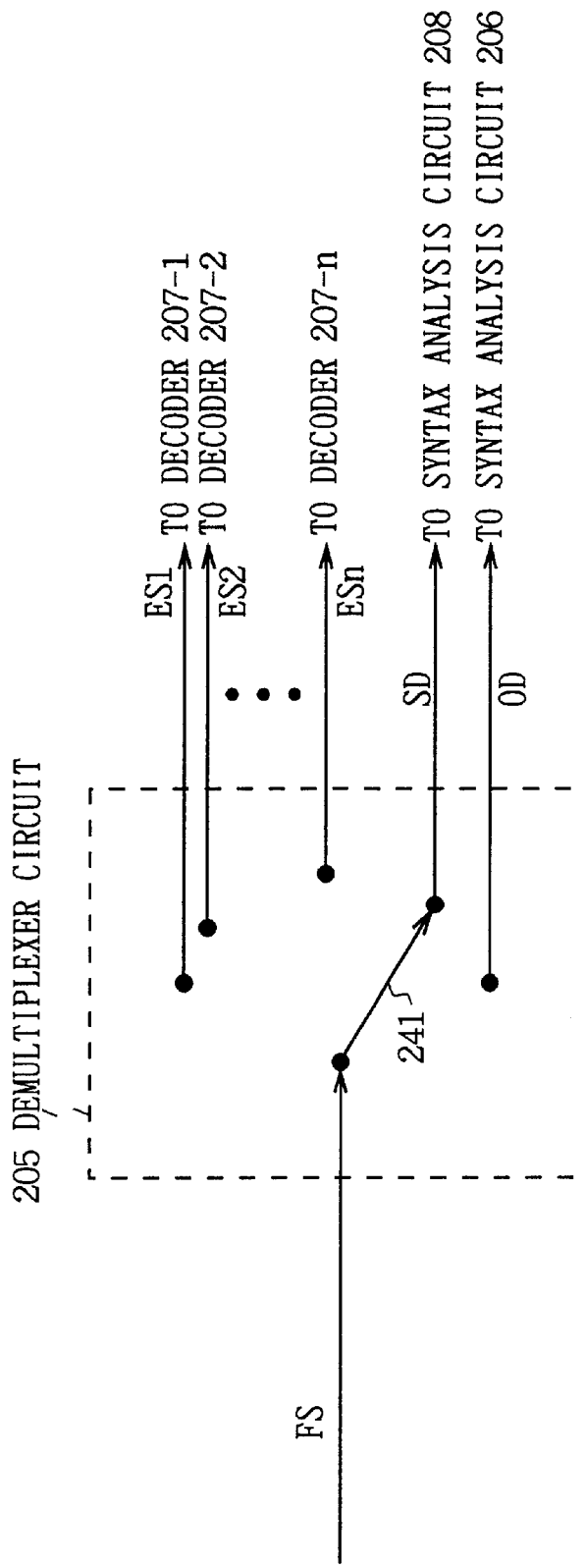
FIG. 3 is a block diagram illustrating an exemplary configuration of a demultiplexer circuit 205 in FIG. 1.

Next, the demultiplexer circuit 205 will be described in detail with reference to FIG. 3. First, a multiplexed bitstream FS is supplied to a switch 241. The switch 241 first detects a start code to recognize respective data subsequent thereto. After detecting the start code, the switch reads and outputs a scene descriptor SD. Next, the connection of the switch 241 is changed to read and output object descriptors ODs. The number of the object descriptors ODs are equal to that of objects, and are read in sequence. After all the object descriptors OD are outputted, the connection of the switch 241 is again changed to read and output respective bitstreams ES1–ESn in accordance with predetermined connections. A read scene descriptor SD is supplied to a syntax analysis circuit (parser) 208 for analysis, as illustrated in FIG. 1. The syntax-analyzed scene description is supplied to a reconstruction circuit 209 as three-dimensional object information. While the three-dimensional object information actually comprises information on a node, a polygon, and so on, it is appropriately designated as a node in the following description. Also, the read object descriptors ODs are supplied to a syntax analysis circuit (parser) 206 for analysis, as illustrated in FIG. 1. The syntax analysis circuit 206 identifies the type and the number of required decoders to supply required decoders 207-1 to 207-n with the respective bitstreams ES1–ESn. Also, the amount of buffers required to decode the respective bitstreams, and so on are read from the object descriptors ODs, and outputted from the syntax analysis circuit 206 to the respective decoders 207-1 to 207-n. Each of the decoders 207-1 to 207-n is initialized on the basis of initialization information such as the buffer size supplied from the syntax analysis circuit 206 (i.e., transmitted through the object descriptors ODs). The syntax analysis circuit 206 also reads ID numbers OD_IDs of the respective object descriptors ODs in order to identify which object each of the bitstreams ES1–ESn belong to. Then, the ID numbers OD_IDs of the respective object descriptors ODs are outputted from the syntax analysis circuit 206 to the decoders 207-1 to 207-n assigned to decode bitstreams described in the object descriptors ODs.

Each of the decoders 207-1 to 207-n decodes an associated bitstream based on a predetermined decoding method corresponding to the encoding, and outputs a video or audio signal to the reconstruction circuit 209. Each of the decoders 207-1 to 207-n also outputs the signal ID number OD_ID to the reconstruction circuit 209 for indicating which object its image belongs to. When an image signal is outputted, each of the decoders 207-1 to 207-n decodes signals indicative of its position and size (PS, SZ) from the bitstream and outputs the signals to the reconstruction circuit 209. Also, when an image signal is outputted, each of the decoders 207-1 to 207-n further decodes a signal indicative of transparency (Key signal) from the bitstream, and outputs the signal to the reconstruction circuit 209.

Figure 4:
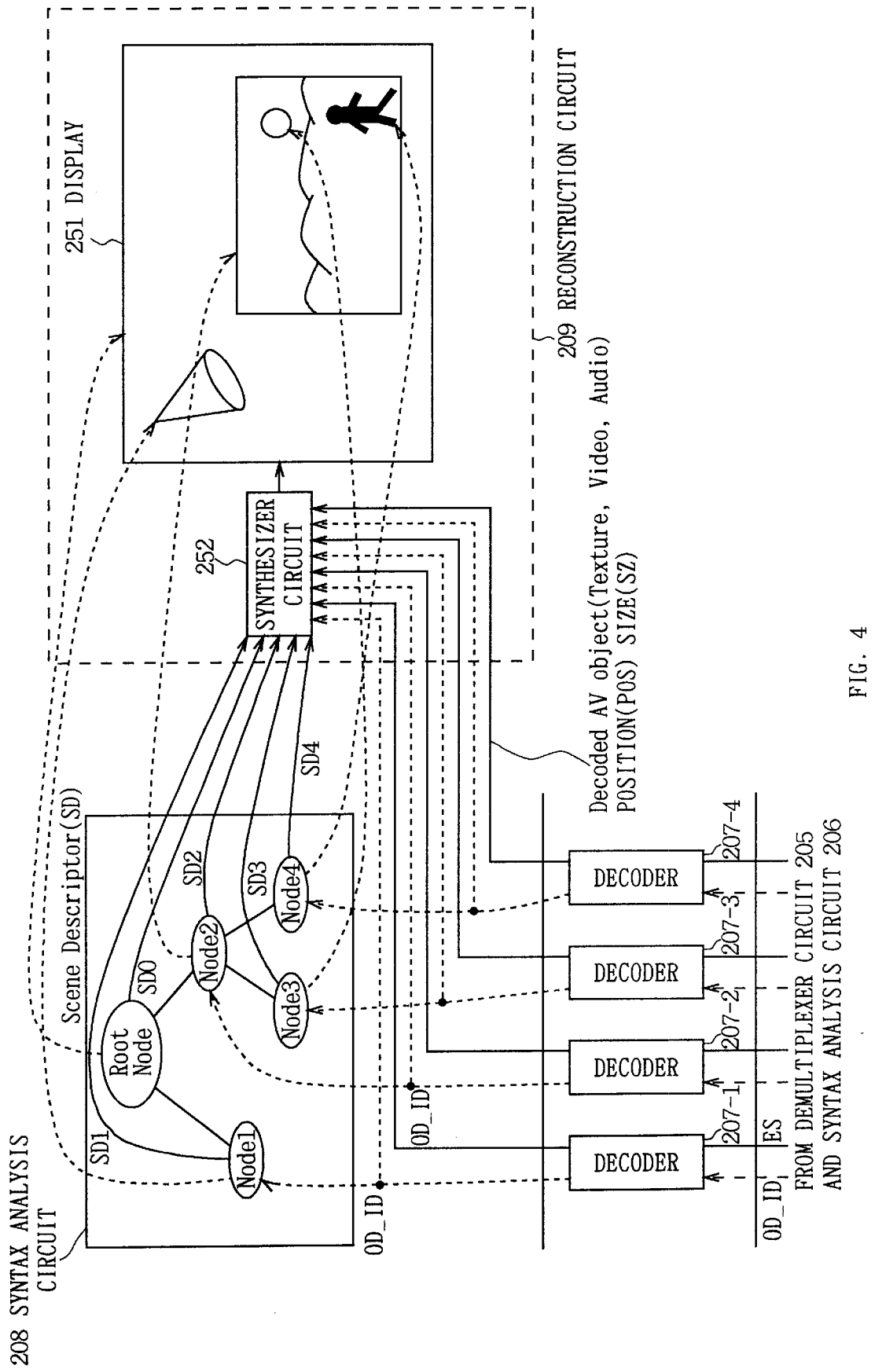
FIG. 4 is a diagram illustrating a correspondence relationship between respective signals for reconstructing an image and a reconstruction circuit 209 in FIG. 1.
Figure 5:
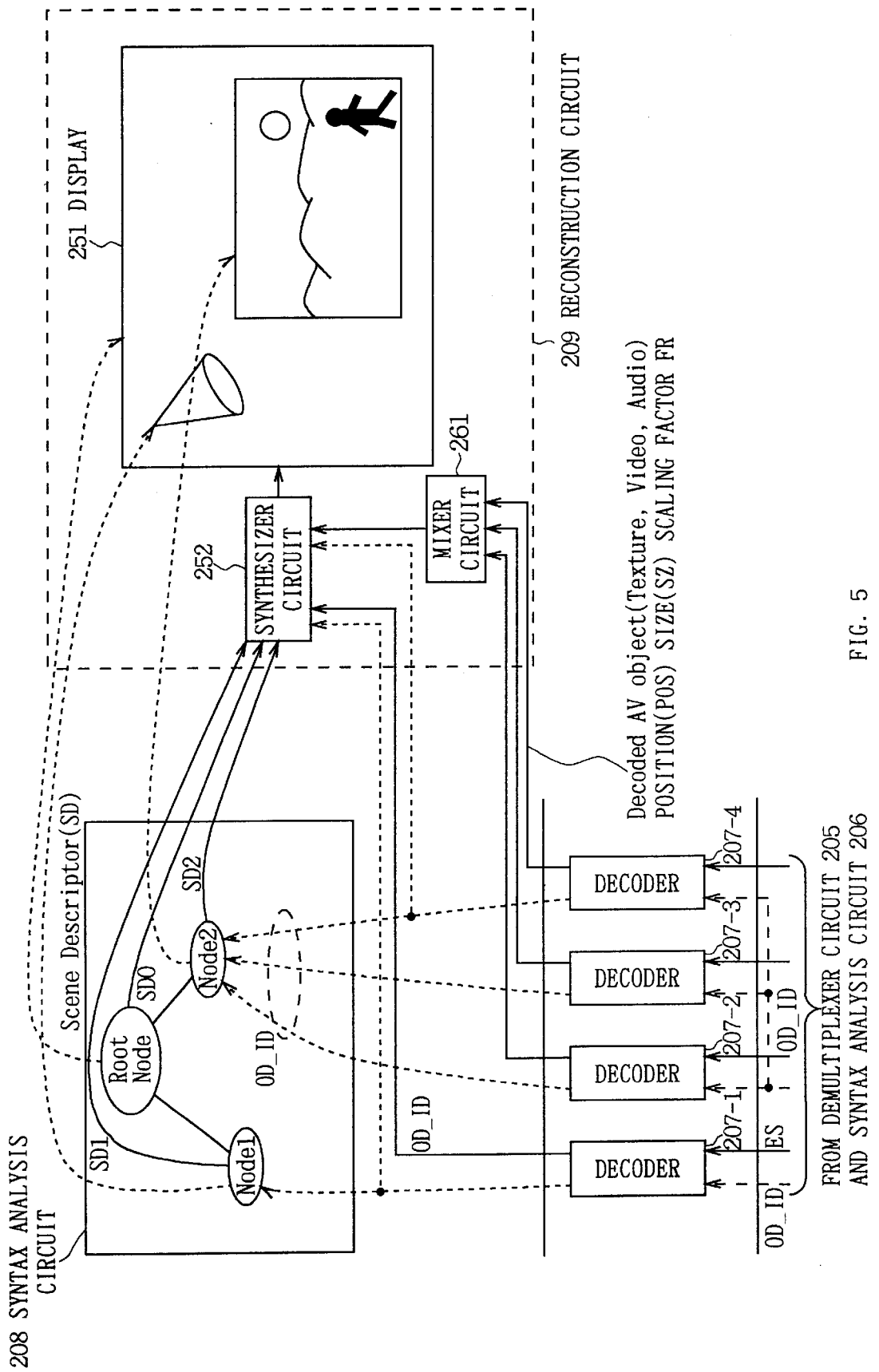
FIG. 5 is a diagram illustrating a correspondence relationship between respective signals for reconstructing an image and the reconstruction circuit 209 in FIG. 1.

Next, a correspondence relationship between respective signals for reconstructing an image and the reconstruction circuit 209 will be described with reference to FIGS. 4 and 5. FIG. 4 illustrates an exemplary case where the scalable encoding is not performed, while FIG. 5 illustrates an exemplary case where the scalable encoding is performed.

In FIG. 4, the reconstruction circuit 209 includes a synthesizer circuit 252 such that an image signal produced by the synthesizer circuit 252 is supplied to a display 251 for display. While in FIG. 4, the synthesizer circuit 252 and the display 251 are illustrated as the reconstruction circuit 209, this is intended to show how an image constructed in the synthesizer circuit 252 is shown on the display 251. Actually, the display is not included in the reconstruction circuit 209.

In FIG. 4, a triangular pyramid, produced by a rectangular image sequence and CG, is displayed on the screen of the display 251. A decoded texture is mapped to the object of the triangular pyramid. Here, the texture may be a motion picture or a still image.

FIG. 4 illustrates a correspondence of a scene descriptor SD to an output screen. For the scene descriptor SD, a descriptor such as the VRML, for example, is used. The scene descriptor SD is composed of a group of descriptions called nodes. A parent (route) node SD0 is provided for describing how respective objects are positioned over an entire image. As its child node, a node SD1 is provided for describing information on the triangular pyramid. Also, information on the plane of a rectangle, to which an image is mapped, is described in a node SD2 which is positioned as a child node of the route node SD0. In FIG. 4, an image signal is composed of three video objects VOs. Information on the background as a first VO is described in the node SD2. Also, information on a plane for mapping the sun thereon as a second VO is described in a node SD3. Further, information on a plane to which a human is mapped as a third VO is described in a node SD4. DS3 and SD4 are child nodes of SD2.

Thus, the one scene descriptor SD is composed of the nodes SD0–SD4. Each of the nodes SD0–SD4 corresponds to one three-dimensional or two-dimensional object. In the example of FIG. 4, The node SD0 corresponds to the object of the entire scene; the node SD1 to the object of the triangular pyramid; the node SD2 to the object of the background; the node SD3 to the object of the sun; and the node SD4 to the object of the human, respectively. When a texture is mapped to each node, a flag is required to indicate which bitstream corresponds to each of the nodes. To identify this correspondence, each node has described therein an ID number OD_ID of an object descriptor supplied thereto from a decoder of a corresponding bitstream. This permits one node to correspond to one object descriptor OD. In this way, one video object VO is mapped to one two-dimensional or three-dimensional object. Each of the nodes SD0–SD4, composing the scene descriptor SD, is analyzed by the syntax analysis circuit 208, and supplied to the synthesizer circuit 252 of the reconstruction circuit 209 as three-dimensional object information. The respective decoders 207-1 to 207-4 are supplied with bitstreams ES1–ES4 from the demultiplexer circuit 205, and supplied with ID numbers OD-IDs of corresponding object descriptors ODs from the syntax analysis circuit 206. Each of the decoders 207-1 to 207-4, after decoding an associated bitstream, supplies the synthesizer circuit 252 of the reconstruction circuit 209 with the ID number OD ID and a decoded signal (image or audio), and additionally for an image signal, with a Key signal and signals indicative of the position and the size (POS, SZ) of the image, as decoded signals. Here, the position of the image refers to a relative position of a node to a parent node at one level higher to which the node belongs.

Figure 6:
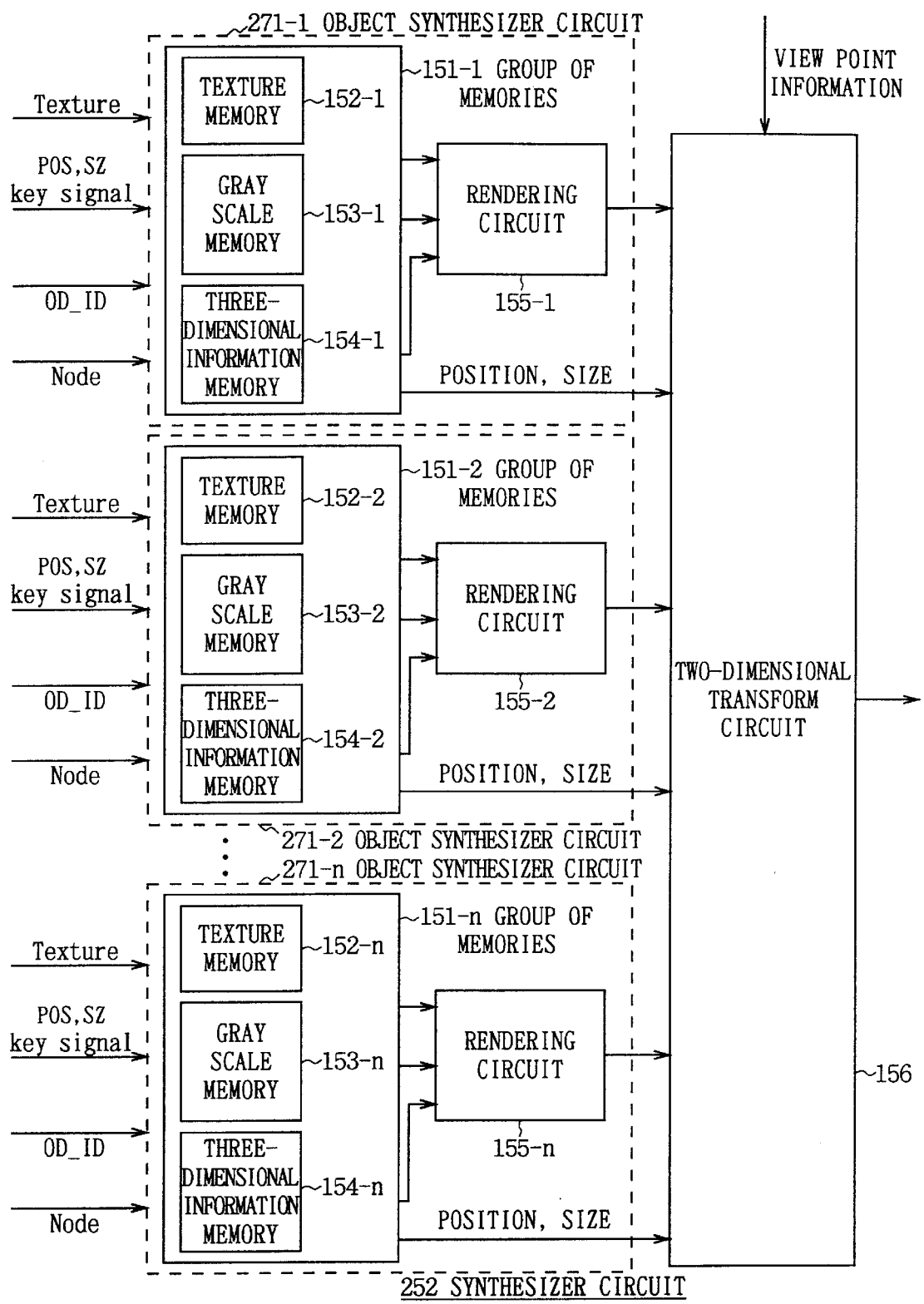
FIG. 6 is a block diagram illustrating an exemplary configuration of a synthesizer circuit 252 in FIG. 5.
Figure 14:
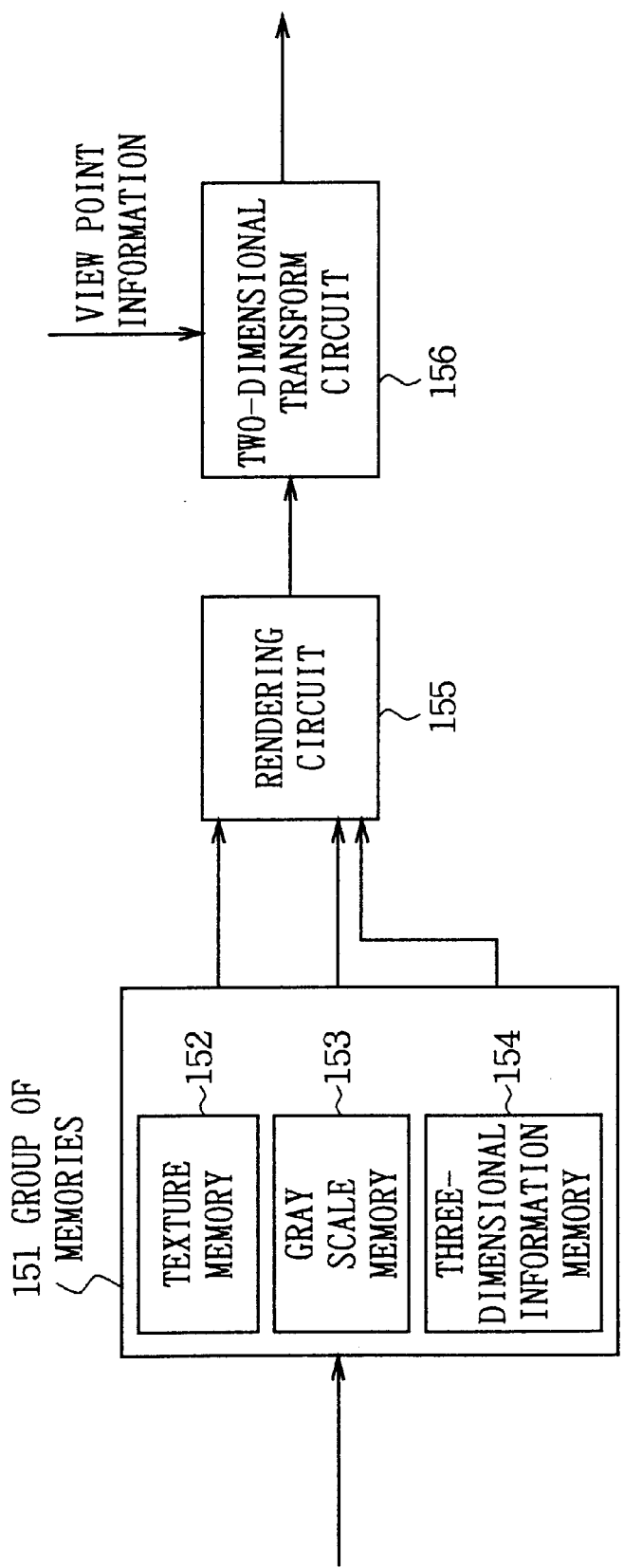
FIG. 14 is a block diagram illustrating an exemplary configuration of a conventional object synthesizing circuit.
Figure 15:
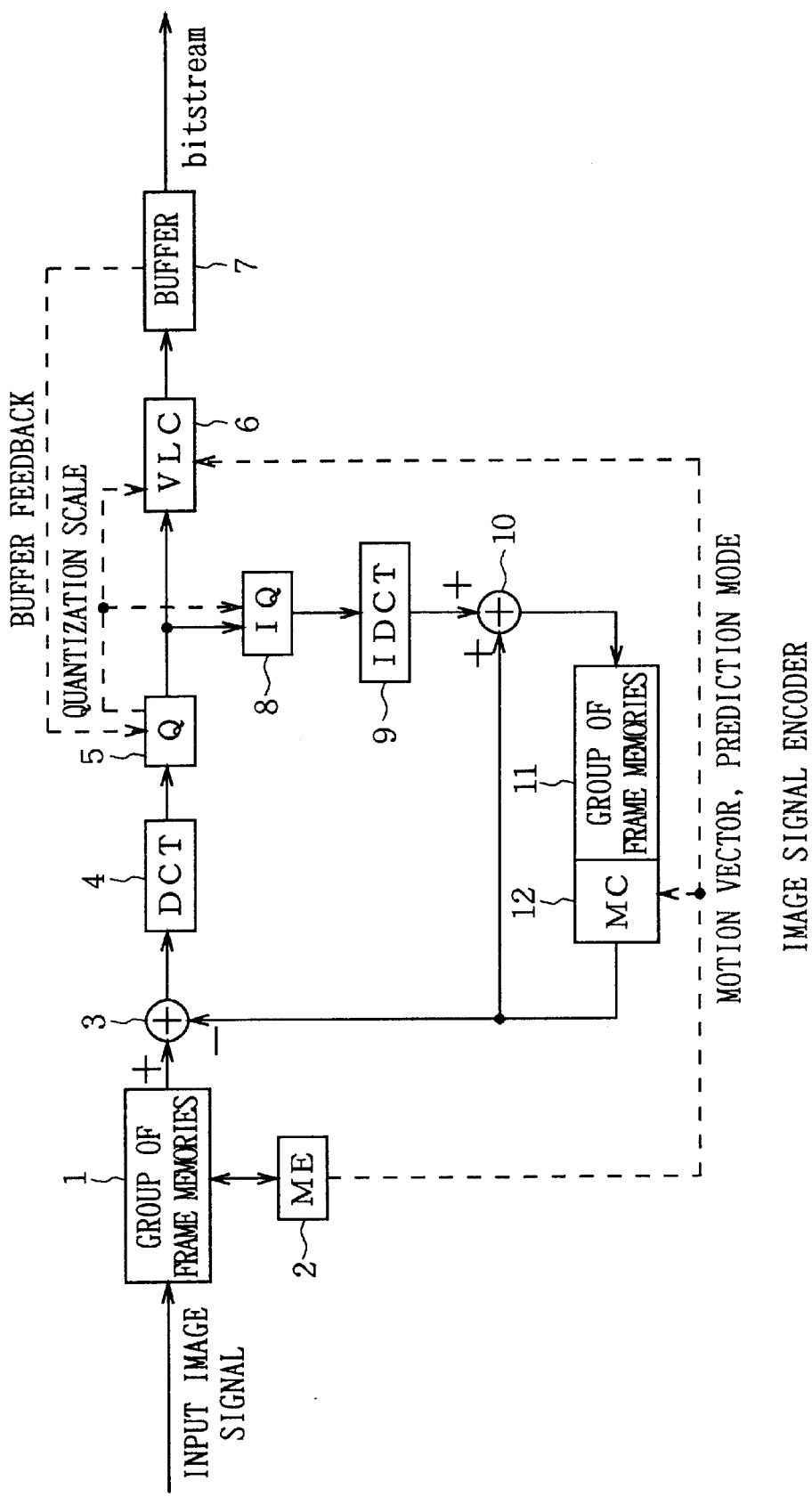
FIG. 15 is a block diagram illustrating an exemplary configuration of a conventional image signal encoder.
Figure 16:
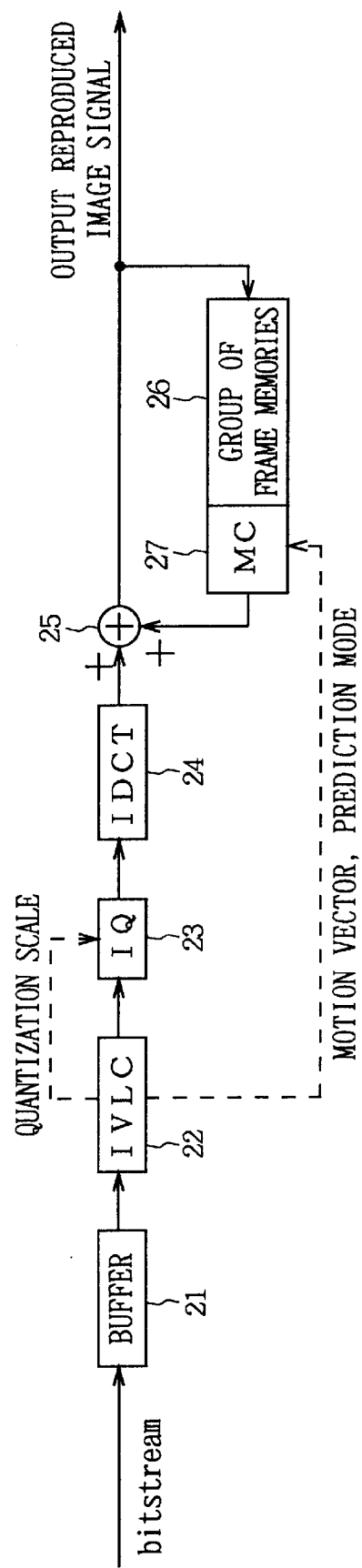
FIG. 16 is a block diagram illustrating an exemplary configuration of a conventional image signal decoder.
Figure 17:
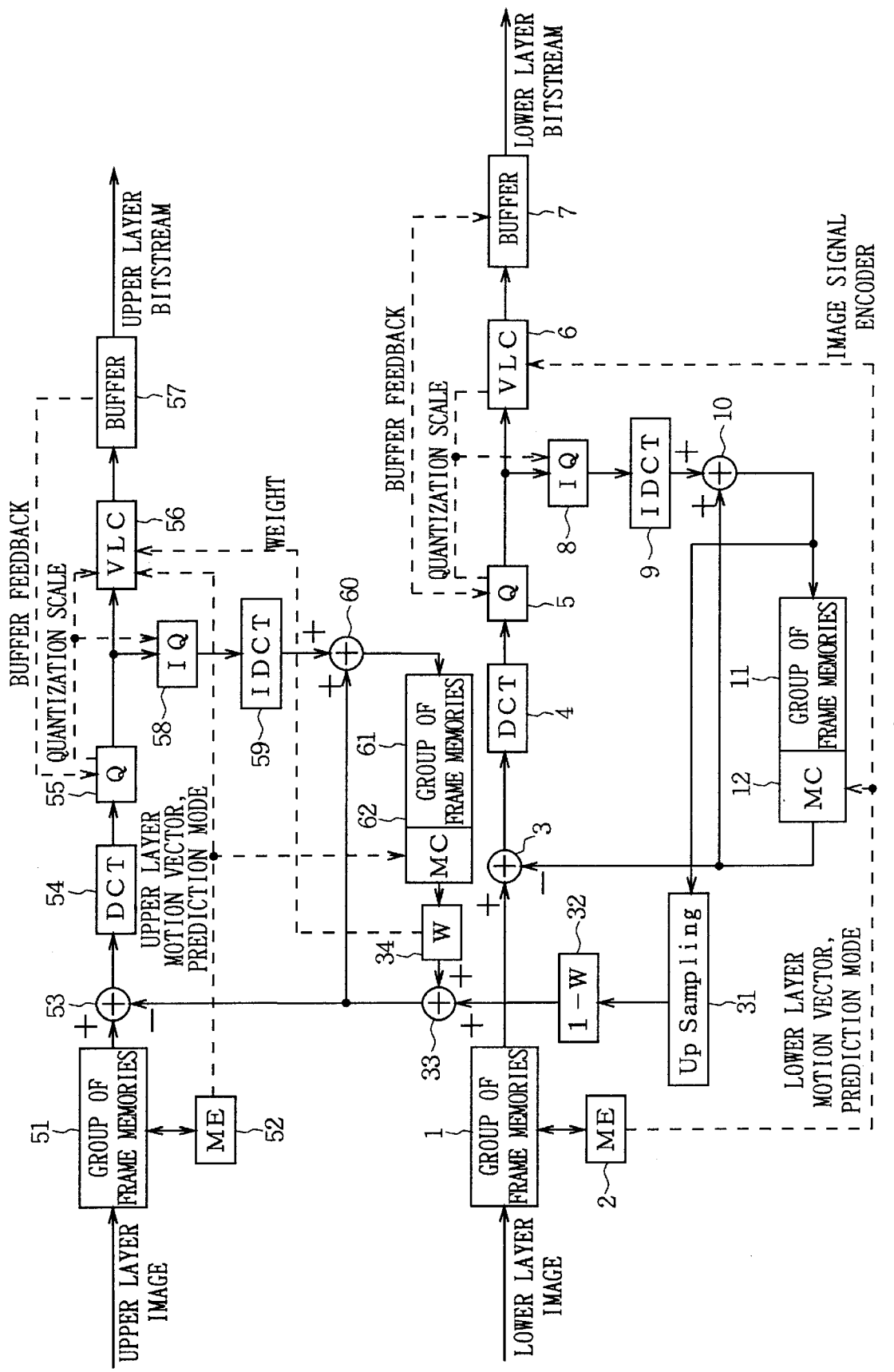
FIG. 17 is a block diagram illustrating another exemplary configuration of a conventional image signal encoder.
Figure 18:
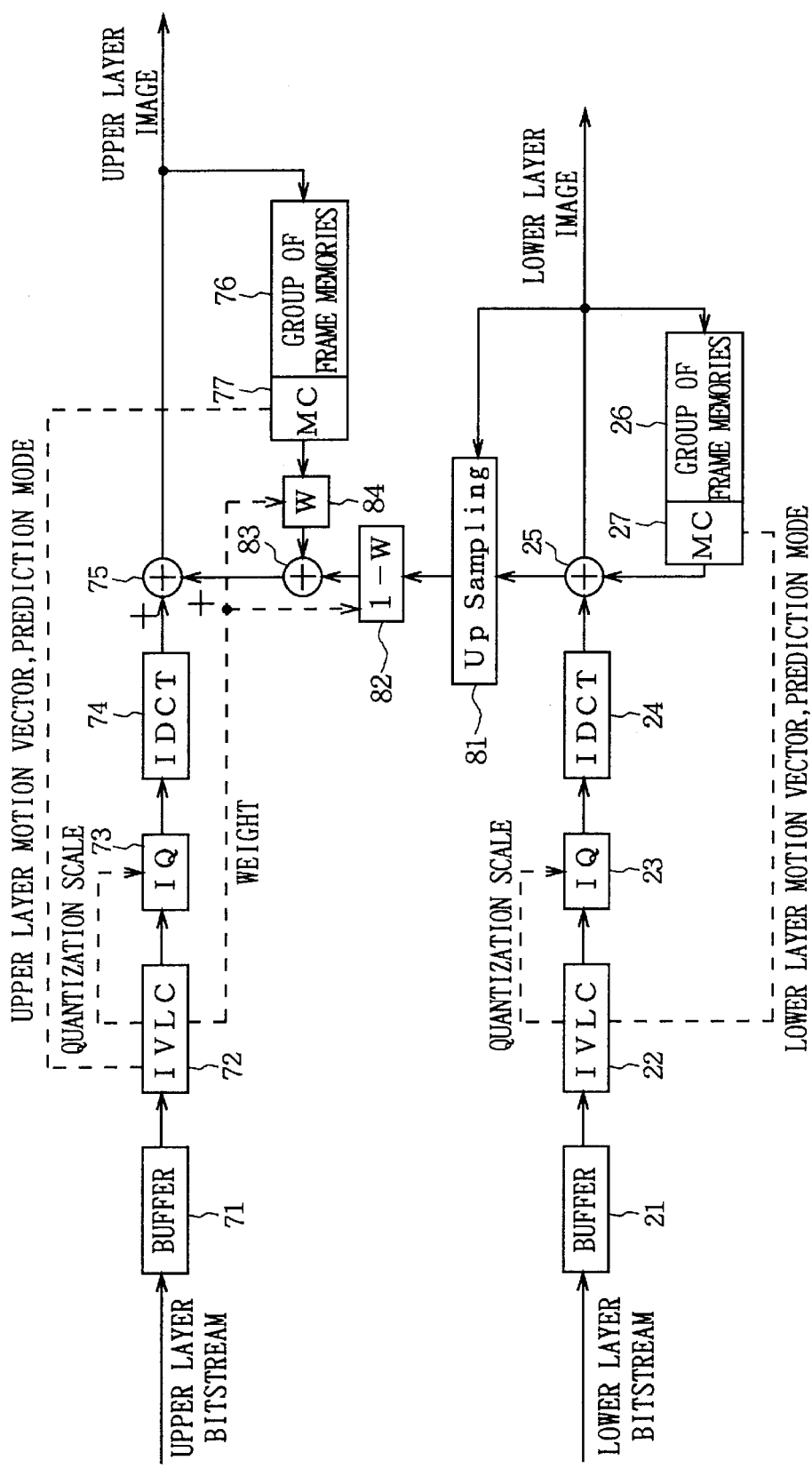
FIG. 18 is a block diagram illustrating another exemplary configuration of a conventional image signal decoder.
Figure 19:
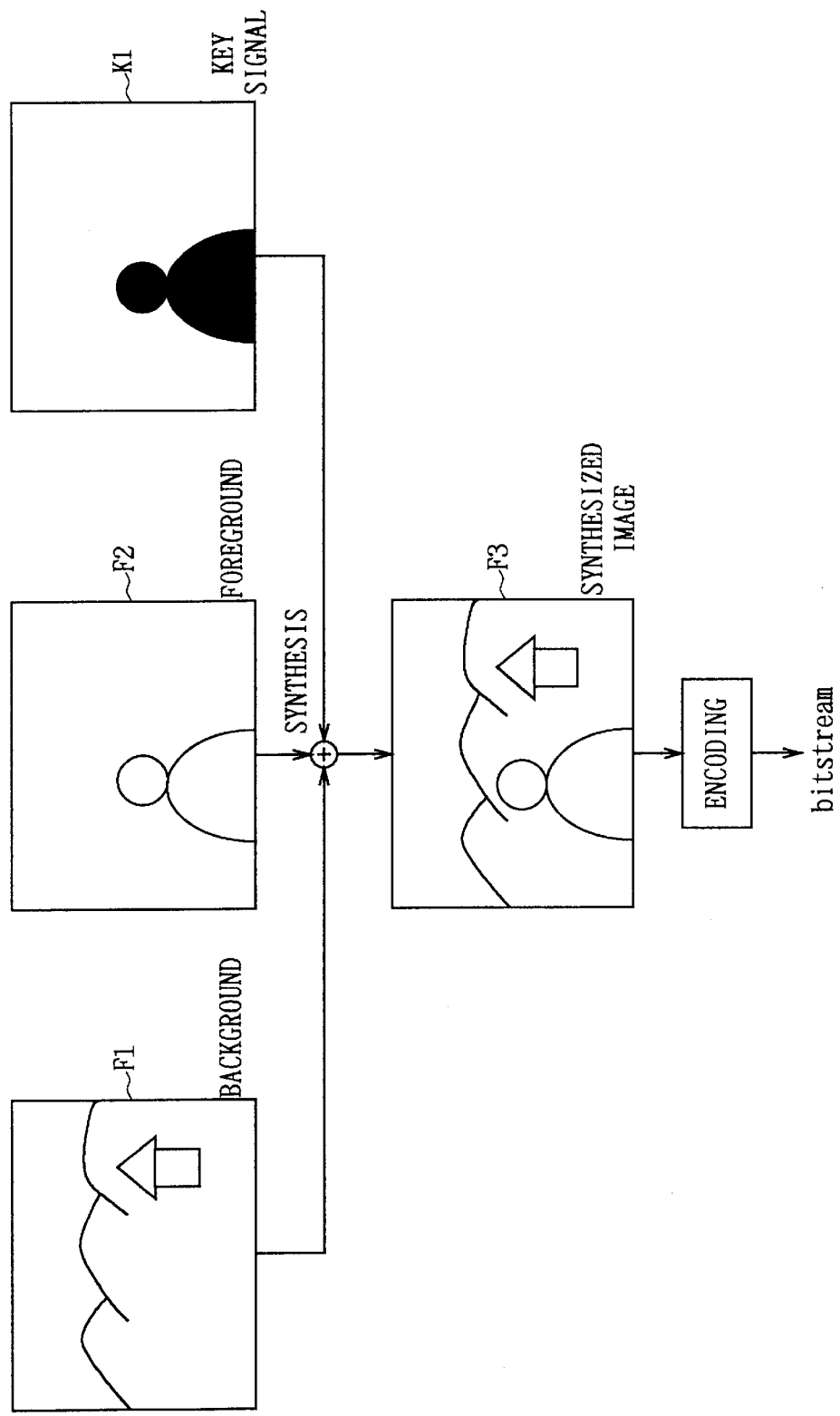
FIG. 19 is a diagram for explaining a conventional synthesis of images.
Figure 20:
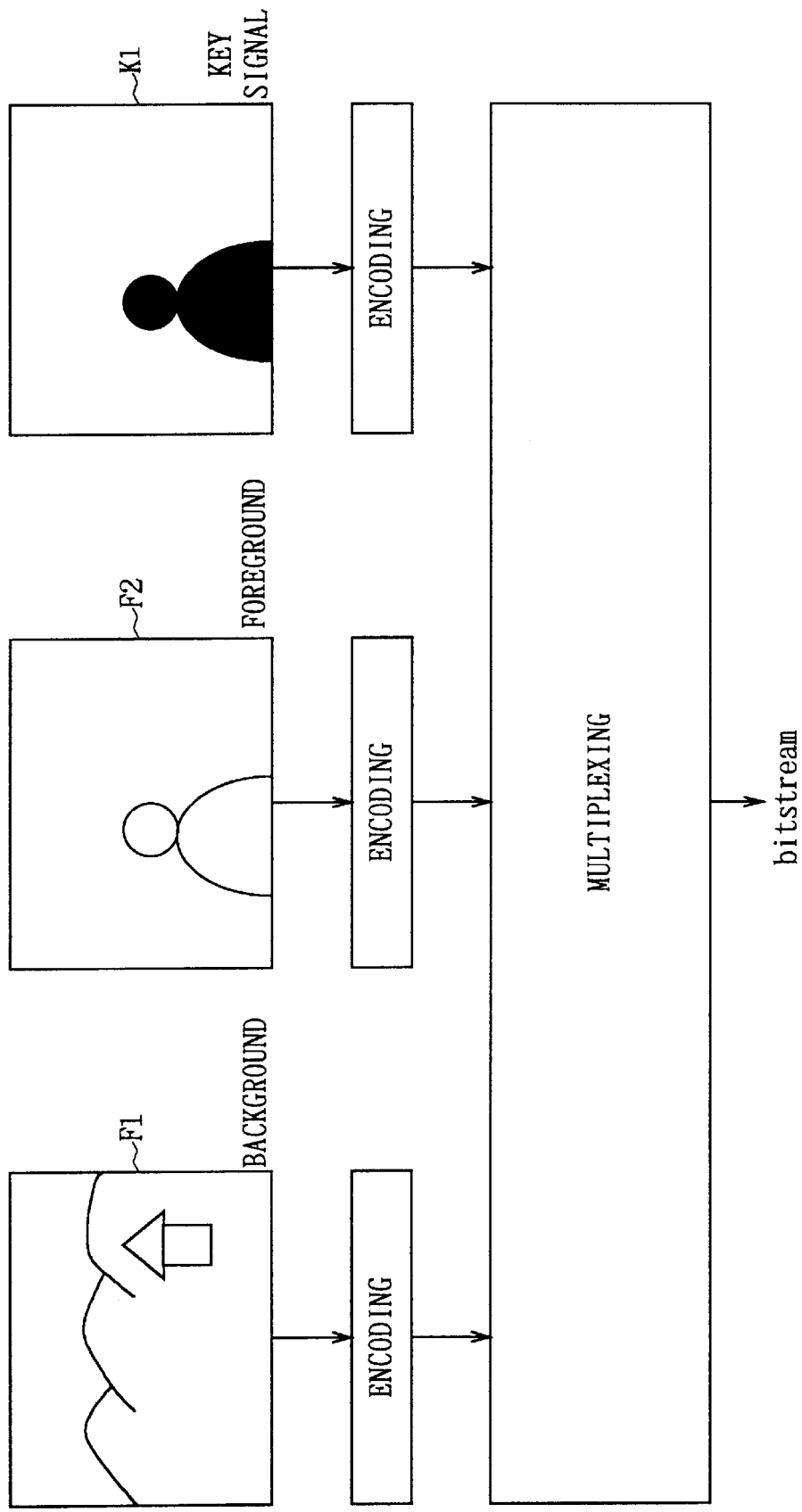
FIG. 20 is a diagram for explaining how images are synthesized.

Next, FIG. 6 illustrates an exemplary configuration of the synthesizer circuit 252. In FIG. 6, parts corresponding to those illustrated in FIG. 14 are designated the same reference numerals. An inputted three-dimensional object information (including nodes SD0–SD4 and each polygon information), image signals (Textures), Key signals (Key Signals), ID numbers OD_IDs, and signals indicative of the position and the size (POS, PZ) are supplied to object synthesizer circuits 271-1 to 271-n, respectively. One node SDi corresponds to one object synthesizer circuit 271-i. The object synthesizer circuit 271-i receives a decoded signal having an ID number OD_ID indicated in the node SDi from a decoder 207-i, and maps the decoded signal to a two-dimensional or three-dimensional object to be generated, when an image signal is reconstructed. As described above, when an ID number OD_ID and a decoded signal are supplied to a corresponding object synthesizer circuit 271-i, it is necessary to find out which node each of the decoded signal corresponds to. Therefore, the correspondence relationship is recognized by collating the ID number OD_ID supplied to the reconstruction circuit 209 with the ID number OD_ID included in the node. Then, a decoded signal is supplied to an object synthesizer circuit 271-i that is supplied with a corresponding node, based on the recognition result.

A texture (image signal) to be mapped, a signal representative of its transparency (Key signal), and signals indicative of its position and size (VOP, SZ), supplied from the decoder 207-i, are stored in a predetermined area in a group of memories 151-i. Similarly, nodes (two-dimensional or three-dimensional object information) supplied from the syntax analysis circuit 208 are stored in a predetermined storage area in the group of memories 151-i. The texture (image signal) is stored in a texture memory 152-i; the signal representative of the transparency (Key Signal) and the ID number OD_ID in a gray scale memory 153-i; and the nodes in a three-dimensional information memory 154-i, respectively. The ID number OD_ID is supplied and used for identifying an object. While the signals indicative of the position and the size (POS, SZ) may be supplied in any memory, they are stored, for example, in the gray scale memory 153-i in this case. Here, the three-dimensional object information refers to polygon formation information, illumination information, and so on. The signals indicative of the position and the size are stored at predetermined locations in the group of memories 151-i.

A rendering circuit 155-i forms a two-dimensional or three-dimensional object with polygons based on the nodes recorded in the memory 154-i. The rendering circuit 155-i reads a predetermined texture and a signal indicative of its transparency from the memory 152-i and the memory 153-i, and maps the texture to a produced three-dimensional object. The signal representative of the transparency indicates the transparency of the texture at a corresponding position, so that it indicates the transparency of the object at the position at which the texture at the corresponding position is mapped. The rendering circuit 155-i supplies a two-dimensional transform circuit 156 with a signal representing the object to which the texture has been mapped. Similarly, the signals indicative of the position and the size of the image (a relative position to the parent node) is read from a predetermined b position in the group of memories 151-i (in this case, the gray scale memory 153-i) and outputted to the two-dimensional transform circuit 156.

The two-dimensional transform circuit 156 is supplied with two-dimensional or three-dimensional objects, to which textures have been mapped, from the object synthesizer circuits 271-1 to 271-n, the number of which is equal to that of the nodes. The two-dimensional transform circuit 156 maps a three-dimensional object to a two-dimensional plane based on view point information supplied from the outside and the signals indicative of the position and the size of the image (POS, SZ) to transform the three-dimensional object into a two-dimensional image signal. The three-dimensional object transformed into the two-dimensional image signal is then outputted to and displayed on the display 251. When all objects are two-dimensional objects, output data from the respective rendering circuits 155-1 to 155-n are synthesized in accordance with the signals indicative of the transparency (Key signal), and the position and the size of the images, and outputted. In this event, a transform according to a view point is not performed.

Next, an example of performing the scalable encoding will be described with reference to FIG. 5. In this case, the reconstruction circuit 209 is composed of a mixer circuit 261 and a synthesizer circuit 252, such that an image signal produced by the mixer circuit 261 and the synthesizer circuit 252 is supplied to and displayed on the display 251. Similarly to FIG. 4, the mixer circuit 261, the synthesizer circuit 252 and the display 251 are also illustrated as the reconstruction circuit 209 in FIG. 5, this is intended to show how an image constructed by the mixer circuit 261 and the synthesizer circuit 252 is shown on the display 251. Actually, the display is not included in the reconstruction circuit 209. Also, in the example of FIG. 5, a rectangular image sequence and a triangular pyramid produced by CG are displayed on the display 251. The object of the triangular pyramid is also mapped with a decoded texture. Here, the texture may be a motion picture or a still image.

FIG. 5 illustrates a correspondence of a scene descriptor SD to an output screen. In FIG. 5, a parent node SD0 is provided for describing how respective objects are positioned over an entire image. As its child nodes, there are a node SD1 for describing information on the triangular pyramid, and a node SD2 for describing information on a rectangular plane to which an image is mapped. An image signal corresponded by the code SD2 in FIG. 5 is different from that in the example of FIG. 4, and is composed of a single video object VO. However, in FIG. 5, an image corresponded by the node SD2 is subjected to three-layer scalable encoding, so that the VO is assumed to be formed of three video object layers. While FIG. 5 illustrates an example of three-layer scalable encoding, the number of layers may be arbitrary.

The respective nodes SD0–SD2 composing the scene descriptor SD are interpreted by the syntax analysis circuit 208, and the analysis result is supplied to the synthesizer circuit 252. The respective decoders 207-1 to 207-4 are supplied with bitstreams ES1–ESn from the demultiplexer circuit 205 as well as ID numbers OD_IDs of corresponding object descriptors ODs from the syntax analysis circuit 206. Each of the decoders 207-1 to 207-4, after decoding the associated bitstream, supplies the mixer circuit 201 with a decoded signal, and additionally for an image, a Key signal, signals indicative of the position and the size of the image (VOP, SZ), and a signal RF indicative of a scaling factor. Here, the position of the image refers to a relative position of each layer in the same video object VO. Each of the decoders 207-1 to 207-4 also supplies the ID number OD_ID to the synthesizer circuit 252. Since the configuration of the synthesizer circuit 252 is similar to that illustrated in FIG. 6, description thereon is omitted here. As described above, when an ID number OD_ID and a decoded signal are supplied to a corresponding object synthesizer circuit 271-i, it is necessary to find out which node the decoded signal corresponds to. Therefore, the correspondence relationship is recognized by collating the ID number OD_ID supplied to the reconstruction circuit 209 with the ID number OD_ID included in the node. Then, a decoded signal is supplied to an object synthesizer circuit 271-i that is supplied with a corresponding node, based on the recognition result.

In the scalable encoding, since bitstreams of respective layers (VOL) belong to the same video object VO, they have the same ID number OD_ID. One VO corresponds to one node, and correspondingly, one texture memory 152-i corresponds to one VO in the synthesizer circuit 252. Therefore, in the scalable encoding, outputs of respective layers (outputs of the decoders 207-2 to 207-4) are once supplied to the mixer circuit 261 and synthesized into a single image sequence.

The mixer circuit 261 previously synthesizes images of the respective layers based on the image signals, Key signals, signals indicative of scaling factors, and signals indicative of the positions and the sizes of associated images, supplied from the respective decoders 207-2 to 207-4, and outputs the synthesized image to the synthesizer circuit 252. The synthesizer circuit 252 can therefore corresponds one image sequence to one object.

Figure 29:
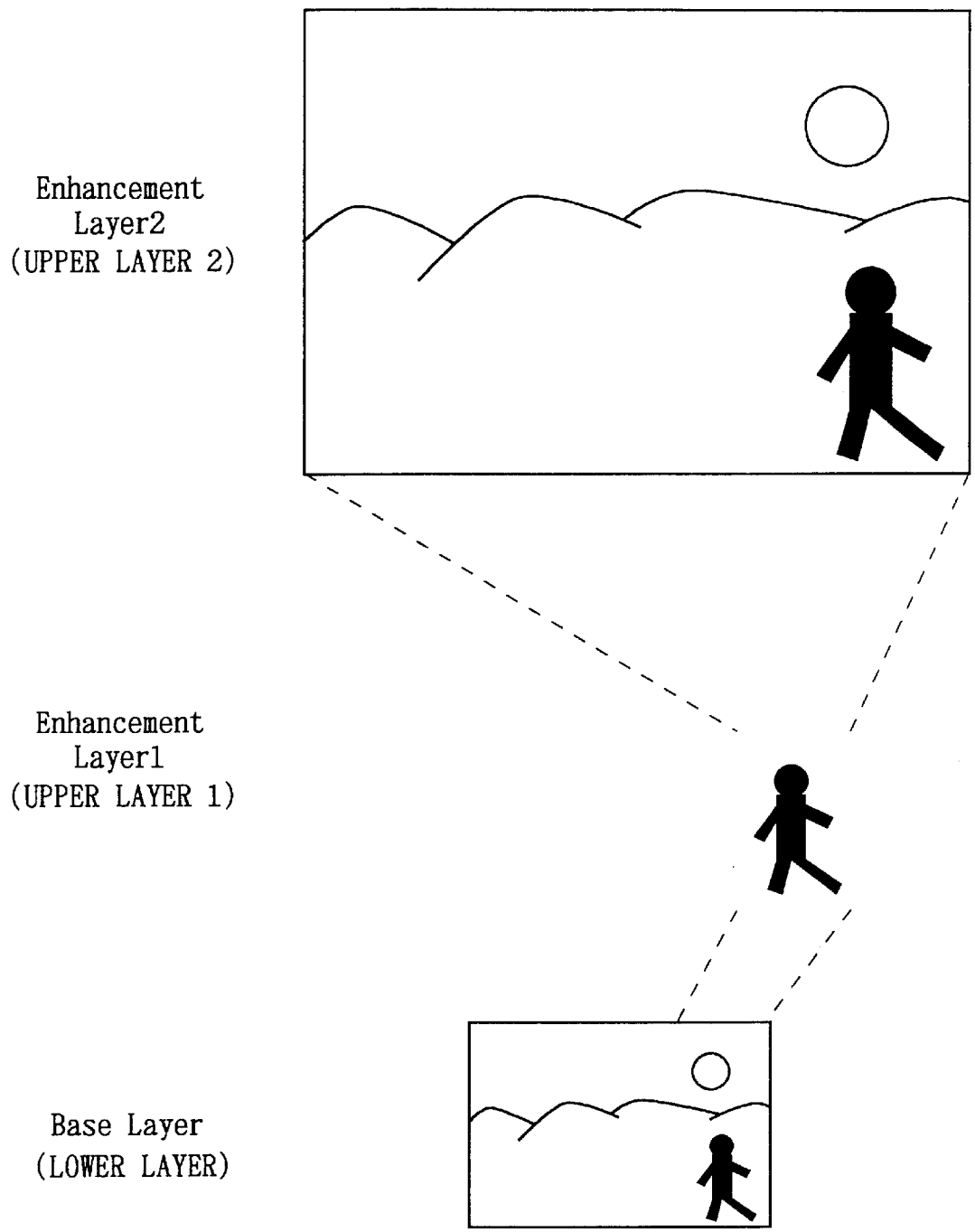
FIG. 29 is a diagram for explaining image objects.

For example, when the scalable encoding as illustrated in FIG. 29 is performed to transmit the lower layer and the upper layer 1 and decode them, the resolution of an image signal of the lower layer is converted on the basis of the signal RF indicative of a scaling factor. Next, a decoded image of the upper layer 1 is synthesized with this image at a corresponding position in accordance with the Key signal.

The image sequence synthesized by the mixer circuit 261 is supplied to the synthesizer circuit 252. The synthesizer circuit 252 composes an image in a manner similar to FIG. 4, and outputs the final output image to the display 251.

In this way, one object (a video object VO when a video) is allocated to one node in this example. The mixer circuit 261 is provided at a stage prior to the group of memories 151 for storing textures and three-dimensional information in the rendering circuit 155. After the mixer circuit 261 mixes a plurality of images in accordance with predetermined Key signals, the mixed image is recorded in the texture memory. In this way, an image signal composed of a plurality of images with different resolutions can be mapped to a texture.

Also, as mentioned above, in the example of FIG. 1, a descriptor for recording system information on bitstreams forming an object is produced for the object. In this event, only information on bitstreams which must be essentially decoded is stored, and the bitstreams described in the descriptor are all decoded. In this way, a combination of decodable bitstreams is identified, and a predetermined signal can be decoded. In this event, the descriptor is produced in a one-to-one corresponding relationship between the transmission side and the reception side, and transmitted.

Next, FIGS. 7 to 9 show the structure of an object descriptor OD. FIG. 7 shows the general structure (syntax) of the object descriptor OD.

NODeID is a 10-bit flag indicative of the ID number of an associated object descriptor. This corresponds to the aforementioned OD_ID. streamCount is an 8-bit flag indicative of the number of bitstreams ESs included in the object descriptor. Information required for decoding the bitstreams Ess, i.e., ES_Descriptor, the number of which is equal to the value in streamCount, are transmitted. Further, extentionFlag is a flag indicative of whether or not another descriptor is transmitted. When this value is one, another descriptor is transmitted.

ES_Descriptor is a descriptor for indicating information related to each bitstream. FIG. 8 shows the structure (syntax) of ES_Descriptor. ES_Number is a 5-bit flag indicative of an ID number for identifying the bitstream. Also, streamType is an 8-bit flag indicative of the format of the bitstream, for example, an MPEG2 video or the like. Further, QoS_Descriptor is an 8-bit flag indicative of a request for a network upon transmission.

ESConFigParams is a descriptor in which information required to decode an associated bitstream is decoded. Its structure (syntax) is shown in FIG. 9. Details on ESConFigParam are described in MPEG4 System VM.

FIG. 10 shows a scene descriptor for mapping a motion picture. SFObjectID is a flag indicative of an ID number OD_ID that is the ID of an object descriptor of a texture to be mapped. FIG. 11 shows a scene descriptor for mapping a still image. SFObjectID is a flag indicative of an ID number OD_ID of an object descriptor of a texture to be mapped. The formats in FIGS. 10 and 11 conform to a node description of the VRML.

Figure 12:
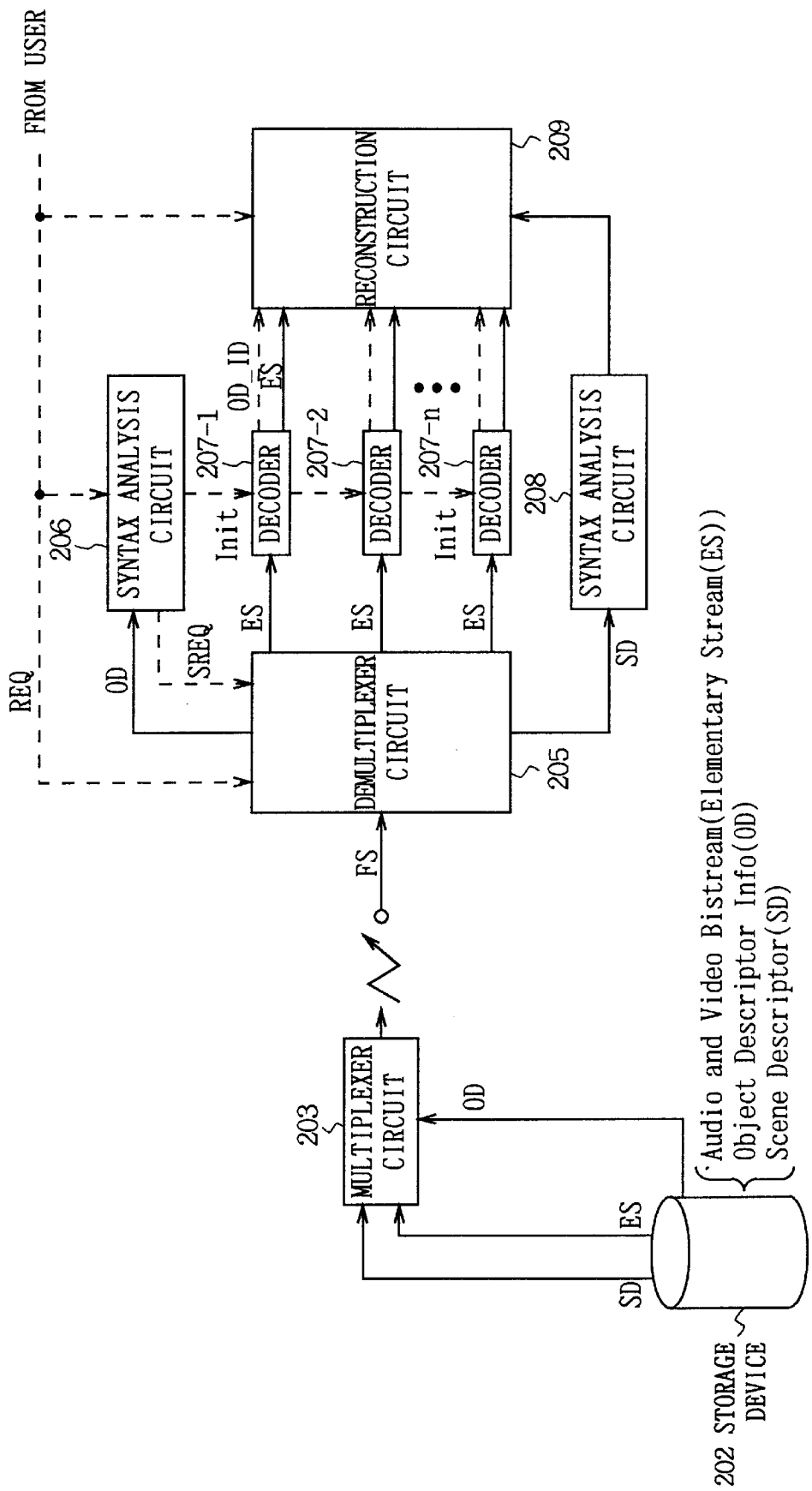
FIG. 12 is a block diagram illustrating other exemplary configurations of an image signal multiplexing apparatus and an image signal demultiplexing apparatus according to the present invention.

Next, a bitstream multiplexing apparatus and a demultiplexing apparatus according to a second embodiment are illustrated in FIG. 12. In this embodiment, all bitstreams belonging to an object are multiplexed and transmitted. In the first embodiment, only those bitstreams requested from the reception side are multiplexed and transmitted. In this event, object descriptors ODs are generated in accordance with bitstreams to be transmitted. Since all bitstreams described in the object descriptors ODs are decoded on the reception side, it is not necessary to particularly transmit a dependency relationship of information between bitstreams.

In the second embodiment, object descriptors ODs have been previously stored in a storage device 202, so that bitstreams described in the object descriptors ODs are all multiplexed and transmitted on the transmission side. In this event, the object descriptor OD in the second embodiment differs from the first embodiment in that a dependency relationship of information between bitstreams is described therein. In other respects, the second embodiment is similar to the first embodiment.

A multiplexer circuit 203 reads a scene descriptor SD, object descriptors ODs and a group of bitstreams ESs recorded in the storage device 202, and multiplexes them in a predetermined order for transmission. The order of transmission and the configuration of the multiplexer circuit 203 are similar to those in the first embodiment. A multiplexed bitstream FS is supplied to a demultiplexer circuit 205 through a transmission path.

The user inputs a request signal REQ from a terminal for indicating which object is to be displayed. The request signal REQ is supplied to the demultiplexer circuit 205, a syntax analysis circuit 206 and a reconstruction circuit 209. The syntax analysis circuit 206 analyzes each object descriptor OD transmitted thereto, and generates a signal SREQ for requesting required bitstreams, which is supplied to the demultiplexer circuit 205. When the user requests a predetermined bitstream, the object descriptor OD records whether or not another bitstream required to decode the bitstream exists, or which bitstream is required.

The demultiplexer circuit 205 supplies only required bitstreams to decoders 207-1 to 207-n in accordance with the request signal REQ from the user and the signal SREQ for requesting required bitstreams, and supplies required object descriptors ODs to the syntax analysis circuit 206. The syntax analysis circuit 206 analyzes the object descriptors ODs, and outputs initialization information and ID numbers OD_IDs associated with the decoders 207-1 to 207-n to the respective decoders 207-1 to 207-n based on the object descriptors ODs and the request signal REQ from the user. Subsequently, decoding, synthesis and display are performed in a manner similar to the first embodiment.

Thus, in this example, a descriptor (object descriptor) is produced for a certain object to record system information on bitstreams which compose the object. In this event, a flag indicative of a bitstream required to decode each bitstream is recorded in the descriptor, and a predetermined bitstream is decoded in accordance with the flag described in the descriptor to identify a combination of decodable bitstreams, thus making it possible to decode a predetermined signal. In this event, after the descriptor is once generated on the transmission side, the descriptor is commonly transmitted to all recipients.

In the second embodiment, the object descriptor OD is different from that of the first embodiment in that it describes information for identifying another bitstream required to decode a predetermined bitstream. Description is now made on the object descriptor OD in the second embodiment. The general structure of the object descriptor OD is similar to the first embodiment shown in FIG. 7.

FIG. 13 shows ES_Descriptor for describing information related to each bitstream. isOtherStream is a one-bit flag which indicates whether or not another bitstream is required for decoding an associated bitstream. If this value is zero, the associated bitstream can be decoded alone. If the value of isotherstream is one, the associated bitstream cannot be decoded alone.

streamcount is a five-bit flag indicating how many bitstreams are additionally required. The required number of ES_Numbers are transmitted on the basis of streamCount. ES_Number is an ID for identifying a bitstream required for decoding. The remaining structure of ES_Descriptor is similar to the first embodiment. Also, the structure of ESConFigParams, representative of information required to decode each bitstream is similar to that in the first embodiment illustrated in FIG. 9.

The processing as described above (multiplexing and demultiplexing) can be implemented in software program, and such program can be transmitted (provided) to the user, wherein communication media such as a network, a satellite and so on may be utilized as a transmission medium other than recording media such as a magnetic disc, a CD-ROM, a solid-state memory and so on. In addition, it goes without saying that the foregoing processing can be implemented in hardware other than the realization as a program.

A variety of modifications and applications can be contemplated without departing from the gist of the present invention. Therefore, the gist of the present invention is not limited to the embodiments.

An image signal multiplexing apparatus and method, and a program for multiplexing image signals to be transmitted through a transmission medium in the present invention are adapted to select spatial configuration information for describing a predetermined object and for selecting streams constituting the predetermined object from among a plurality of layers of bitstreams having different qualities, produce information related to the object composed of the bitstreams selected by the selecting means, and multiplex the selected spatial configuration information, the selected bitstreams, and the produced information on the object to output the multiplexed information, thus making it possible to apply the texture mapping with scalable bitstreams having a plurality of layers in units of objects.

Also, an image signal multiplexing apparatus and method, and a transmission medium for transmitting a program for multiplexing image signals to be transmitted through the transmission medium in the present invention are adapted to output spatial configuration information for describing a predetermined object, a plurality of layers of bitstreams having different qualities and composing the predetermined object, and information related to the object including at least dependency information representative of a dependency relationship between different bitstreams, and multiplex the outputted spatial configuration information, plurality of layers of bitstreams, and information related to the object to output the multiplexed information, thus making it possible to independently recover and utilize the bitstreams on a demultiplexing side even in an environment where a multiplexing side is not connected to the demultiplexing side.

Further, an image signal demultiplexing apparatus and method for separating a multiplexed image signal into respective signals, and a program for separating a multiplexed signal transmitted through a transmission medium into respective signals are adapted to separate, from a multiplexed bitstream having multiplexed therein spatial configuration information for describing an object, a plurality of layers of bitstreams having different qualities and composing the object, and information related to the object, the spatial configuration information for describing the object, the plurality of layers of bitstreams composing the object, and the information related to the object, respectively, analyze the spatial configuration information, decode the plurality of layers of bitstreams, mix output signals corresponding to the same object within the decoded output signals, and reconstruct an image signal from the analyzed output data and the mixed output data based on the information related to the object, thus making it possible to ensure that scalable bit streams having a plurality of layers in units of objects are applied to the texture mapping.

Also, an image signal demultiplexing apparatus and method for separating a multiplexed image signal into respective signals, and a program for separating a multiplexed image signal transmitted through a transmission medium into respective image signal in the present invention are adapted to separate, from a transmitted multiplexed bitstream having multiplexed therein spatial configuration information for describing an object, a plurality of layers of bitstreams having different qualities and composing the object, and dependency information indicative of a dependency relationship of information between the different bitstreams, the spatial configuration information for describing the object, the plurality of layers of bitstreams composing the object, and the information related to the object, control to select spatial configuration information for describing a predetermined object, and the plurality of layers of bitstreams composing the object based on a selecting signal and the dependency information, analyze the selected spatial configuration information, decode the plurality of layers of bitstreams, mix output signals corresponding to the same object within the decoded output signals, and reconstruct an image signal from the analyzed output data and the mixed output signal based on the information related to the object, thus making it possible to independently recover and utilize the bitstreams on a demultiplexing side even in an environment where a multiplexing side is not connected to the demultiplexing side.

Industrial Availability

The present invention can be utilized, for example, in an information recording apparatus for recording and reproducing data to and from a recording medium such as a magneto-optical disc, a magnetic disc and so on, an information reproducing apparatus and information recording/reproducing apparatus, and systems such as a television telephone system for transmitting audio data and video data to remote locations, broadcasting equipment, a multimedia database search system, and so on.

What is claimed is:

1. An image signal multiplexing apparatus comprising:
    selecting means for selecting a scene descriptor, which is spatial configuration information for describing a predetermined scene of two-dimensions or three-dimensions, and for selecting bitstreams constituting said predetermined scene from among a plurality of layers of bitstreams having different qualities;
    producing means for producing information related to said selected bitstreams; and
    multiplexing means for multiplexing said selected scene descriptor, said selected bitstreams, and said produced information related to said selected bitstreams to output a multiplexed information.

2. An image signal multiplexing apparatus according to claim 1, wherein
    said information related to said selected bitstreams includes at least one of a flag indicative of said scene descriptor, a flag indicative of the number of bitstreams, and information required to decode the bitstreams.

3. An image signal multiplexing method comprising the steps of:
    selecting a scene descriptor, which is spatial configuration information for describing a predetermined scene of two-dimensions or three-dimensions, and for selecting bitstreams constituting said predetermined scene from among a plurality of layers of bitstreams having different qualities;
    producing information related to said selected bitstreams; and
    multiplexing said selected scene descriptor, said selected bitstreams, and said produced information related to said selected bitstreams to output a multiplexed information.

4. An image signal multiplexing method according to claim 3, wherein
    said information related to said selected bitstreams includes at least one of a flag indicative of said scene descriptor, a flag indicative of the number of bitstreams, and information required to decode the bitstreams.

5. A transmission medium for transmitting a program for multiplexing image signals, the program comprising the steps of:
    selecting a scene descriptor, which is spatial configuration information for describing a predetermined scene of two-dimensions or three-dimensions, and for selecting bitstreams constituting said predetermined scene from among a plurality of layers of bitstreams having different qualities;
    producing information related to said selected bitstreams; and
    multiplexing said selected scene descriptor, said selected bitstreams, and said produced information related to said selected bitstreams to output a multiplexed information.

6. An image signal multiplexing apparatus comprising:
    outputting means for outputting a scene descriptor, which is spatial configuration information for describing a predetermined scene of two-dimensions or three-dimensions, a plurality of layers of bitstreams having different qualities, said bitstreams composing said predetermined scene, and information related to said bitstreams including at least dependency information representative of a dependency relationship between different bitstreams; and
    multiplexing means for multiplexing said outputted scene descriptor, plurality of layers of bitstreams, and information related to said bitstreams to output a multiplexed information.

7. An image signal multiplexing apparatus according to claim 6, wherein
    said information related to said bitstreams includes at least one of a flag indicative of said scene descriptor, a flag indicative of the number of bitstreams, and information required to decode the bitstreams, and wherein said dependency information is at least one of a flag for identifying one of said bitstreams and a flag representing whether or not another bitstream is required to recover said scene.

8. An image signal multiplexing method comprising the steps of:
    outputting a scene descriptor, which is spatial configuration information for describing a predetermined scene of two-dimensions or three-dimensions, a plurality of layers of bitstreams having different qualities, said bitstreams composing said predetermined scene, and information related to said bitstreams including at least dependency information representative of a dependency relationship between different bitstreams; and multiplexing said outputted scene descriptor, plurality of layers of bitstreams, and information related to said bitstreams to output a multiplexed information.

9. An information signal multiplexing method according to claim 8, wherein said information related to said bitstreams includes at least one of a flag indicative of said scene descriptor, a flag indicative of the number of bitstreams, and information required to decode the bitstreams, and wherein said dependency information is at least one of a flag for identifying one of said bitstreams and a flag representing whether or not another bitstream is required to recover said scene.

10. A transmission medium for transmitting a program for multiplexing image signals, the program comprising the steps of:

outputting a scene descriptor, which is spatial configuration information for describing a predetermined scene of two-dimensions or three-dimensions, a plurality of layers of bitstreams having different qualities, said bitstreams composing said predetermined scene, and information related to said bitstreams including at least dependency information representative of a dependency relationship between different bitstreams; and multiplexing said outputted scene descriptor, plurality of layers of bitstreams, and information related to said bitstreams to output a multiplexed information.

11. An image signal demultiplexing apparatus for separating a multiplexed image signal into respective signals, comprising:

separating means for separating from a multiplexed bitstream having multiplexed therein a scene descriptor, which is spatial configuration information for describing a scene of two-dimensions or three-dimensions, a plurality of layers of bitstreams having different qualities, said plurality of bitstreams composing said scene, and information related to said bitstreams, said scene descriptor, said plurality of layers of bitstreams composing said scene, and said information related to said bitstreams, respectively;

analyzing means for analyzing said scene descriptor;

decoding means for decoding said plurality of layers of bitstreams;

mixing means for mixing output signals corresponding to said bitstreams within said decoded output signals; and reconstruction means for reconstructing an image signal from said analyzed scene descriptor and said mixed output signals based on said information related to said bitstreams.

12. An image signal demultiplexing apparatus according to claim 11, wherein said information related to said bitstreams includes at least one flag indicative of said scene descriptor, a flag indicative of the number of bitstreams, and information required to decode the bitstreams.

13. An image signal demultiplexing method for separating a multiplexed image signal into respective signals, comprising the steps of:

separating from a multiplexed bitstream having multiplexed therein a scene descriptor, which is spatial configuration information for describing a scene of two-dimensions or three-dimensions, a plurality of layers of bitstreams having different qualities, said plurality of bitstreams composing said scene, and information related to said bitstreams, said scene descriptor, said plurality of layers of bitstreams composing said scene, and said information related to said bitstreams, respectively;

analyzing said scene descriptor;

decoding said plurality of layers of bitstreams;

mixing output signals corresponding to said bitstreams within said decoded output signals; and reconstructing an image signal from said analyzed scene descriptor and said mixed output signals based on said information related to said bitstreams.

14. An image signal demultiplexing method according to claim 13, wherein said information related to said bitstreams includes at least one flag indicative of said scene descriptor, a flag indicative of the number of bitstreams, and information required to decode the bitstreams.

15. A transmission medium for transmitting a program for separating a multiplexed image signal into respective signals, the program comprising the steps of:

separating from a multiplexed bitstream having multiplexed therein a scene descriptor, which is spatial configuration information for describing a scene of two-dimensions or three-dimensions, a plurality of layers of bitstreams having different qualities, said plurality of bitstreams composing said scene, and information related to said bitstreams, said scene descriptor, said plurality of layers of bitstreams composing said scene, and said information related to said bitstreams, respectively;

analyzing said scene descriptor;

decoding said plurality of layers of bitstreams;

mixing output signals corresponding to said bitstreams within said decoded output signals; and reconstructing an image signal from said analyzed scene descriptor and said mixed output signals based on said information related to said bitstreams.

16. An image signal demultiplexing apparatus for separating a multiplexed image signal into respective signals, comprising:

separating means for separating from a transmitted multiplexed bitstream having multiplexed therein a scene descriptor, which is spatial configuration information for describing a scene of two-dimensions or three-dimensions, a plurality of layers of bitstreams having different qualities, said plurality of bitstreams composing said scene, and information related to said bitstreams, and dependency information indicative of a dependency relationship of information between said different bitstreams, said scene descriptor, said plurality of layers of bitstreams composing said scene, and said information related to said bitstreams;

control means for controlling said separating means to select said scene descriptor and said plurality of layers of bitstreams composing said scene based on said dependency information;

analyzing means for analyzing said selected scene descriptor;

decoding means for decoding said plurality of layers of bitstreams;

mixing means for mixing output signals corresponding to said bitstreams within said decoded output signals; and reconstruction means for reconstructing an image signal from said analyzed scene descriptor and said mixed output signals based on said information related to said bitstreams.

17. An image signal demultiplexing apparatus according to claim 16, wherein said information related to said bitstreams includes at least one flag indicative of said scene descriptor, a flag indicative of the number of bitstreams, and information required to decode the bitstreams, and wherein said dependency information is at least one of a flag for identifying one of said bitstreams and a flag representing whether or not another bitstream is required to recover said scene.

18. An image signal demultiplexing method for separating a multiplexed image signal into respective signals, the method comprising the steps of:

separating from a transmitted multiplexed bitstream having multiplexed therein a scene descriptor, which is spatial configuration information for describing a scene of two-dimensions or three-dimensions, a plurality of layers of bitstreams having different qualities, said plurality of bitstreams composing said scene, and dependency information indicative of a dependency relationship of information between said different bitstreams, said scene descriptor, said plurality of layers of bitstreams composing said scene, and said information related to said bitstreams;

controlling said separating means to select said scene descriptor and said plurality of layers of bitstreams composing said scene based on said dependency information;

analyzing said selected scene descriptor;

decoding said plurality of layers of bitstreams;

mixing output signals corresponding to said bitstreams within said decoded output signals; and reconstructing an image signal from said analyzed scene descriptor and said mixed output signals based on said information related to said bitstreams.

19. An image signal demultiplexing method according to claim 18, wherein said information related to said bitstreams includes at least one flag indicative of said scene descriptor, a flag indicative of the number of bitstreams, and information required to decode the bitstreams, and wherein said dependency information is at least one of a flag for identifying one of said bitstreams and a flag representing whether or not another bitstream is required to recover said scene.

20. A transmission medium for transmitting a program for separating a multiplexed image signal into respective signals, the program comprising the steps of:

separating from a transmitted multiplexed bitstream having multiplexed therein a scene descriptor, which is spatial configuration information for describing a scene of two-dimensions or three-dimensions, a plurality of layers of bitstreams having different qualities, said plurality of bitstreams composing said scene, and dependency information indicative of a dependency relationship of information between said different bitstreams, said scene descriptor, said plurality of layers of bitstreams composing said scene, and said information related to said bitstreams;

controlling said separating means to select said scene descriptor and said plurality of layers of bitstreams composing said scene based on said dependency information;

analyzing said selected scene descriptor;

decoding said plurality of layers of bitstreams;

mixing output signals corresponding to said bitstreams within said decoded output signals; and reconstructing an image signal from said analyzed scene descriptor and said mixed output signals based on said information related to said bitstreams.

\* \* \* \* \*